United States Patent [19]
Smith

[11] 3,977,184
[45] Aug. 31, 1976

[54] ELECTRIC POWER PLANT HAVING A GAS TURBINE WITH AN IMPROVED WIDE RANGE SURGE PROTECTION SYSTEM

[75] Inventor: Jack R. Smith, Pittsburgh, Pa.

[73] Assignee: Westinghouse Electric Corporation, Pittsburgh, Pa.

[22] Filed: Aug. 8, 1974

[21] Appl. No.: 495,715

[52] U.S. Cl. .................. 60/39.18 B; 60/39.28 R
[51] Int. Cl.² .................................................. F02C 7/02
[58] Field of Search ............... 60/39.28 R, 39.28 T, 60/39.14, 39.18; 290/40 A

[56] References Cited
UNITED STATES PATENTS

| | | | |
|---|---|---|---|
| 3,255,586 | 6/1966 | Hennig | 60/39.28 R |
| 3,421,317 | 1/1969 | Bedford | 60/39.28 R |
| 3,422,800 | 1/1969 | La Haye | 60/39.28 R |
| 3,520,133 | 7/1970 | Loft | 60/39.28 R |
| 3,691,759 | 9/1972 | Scheerer | 60/39.14 |
| 3,729,929 | 5/1973 | Kiscaden | 60/39.28 R |
| 3,854,287 | 12/1974 | Rembold | 60/39.28 T |

Primary Examiner—Clarence R. Gordon
Attorney, Agent, or Firm—E. F. Possessky

[57] ABSTRACT

A combined cycle electric power plant includes gas and steam turbines and steam generators and a digital/analog control system. A surge protection system is included as part of the analog portion of the control system, and it functions in both automatic and manual modes of operation. A surge protection signal is generated to limit fuel demand as a function of speed during startup and as a function of combustor shell pressure during higher speed load operation.

21 Claims, 33 Drawing Figures

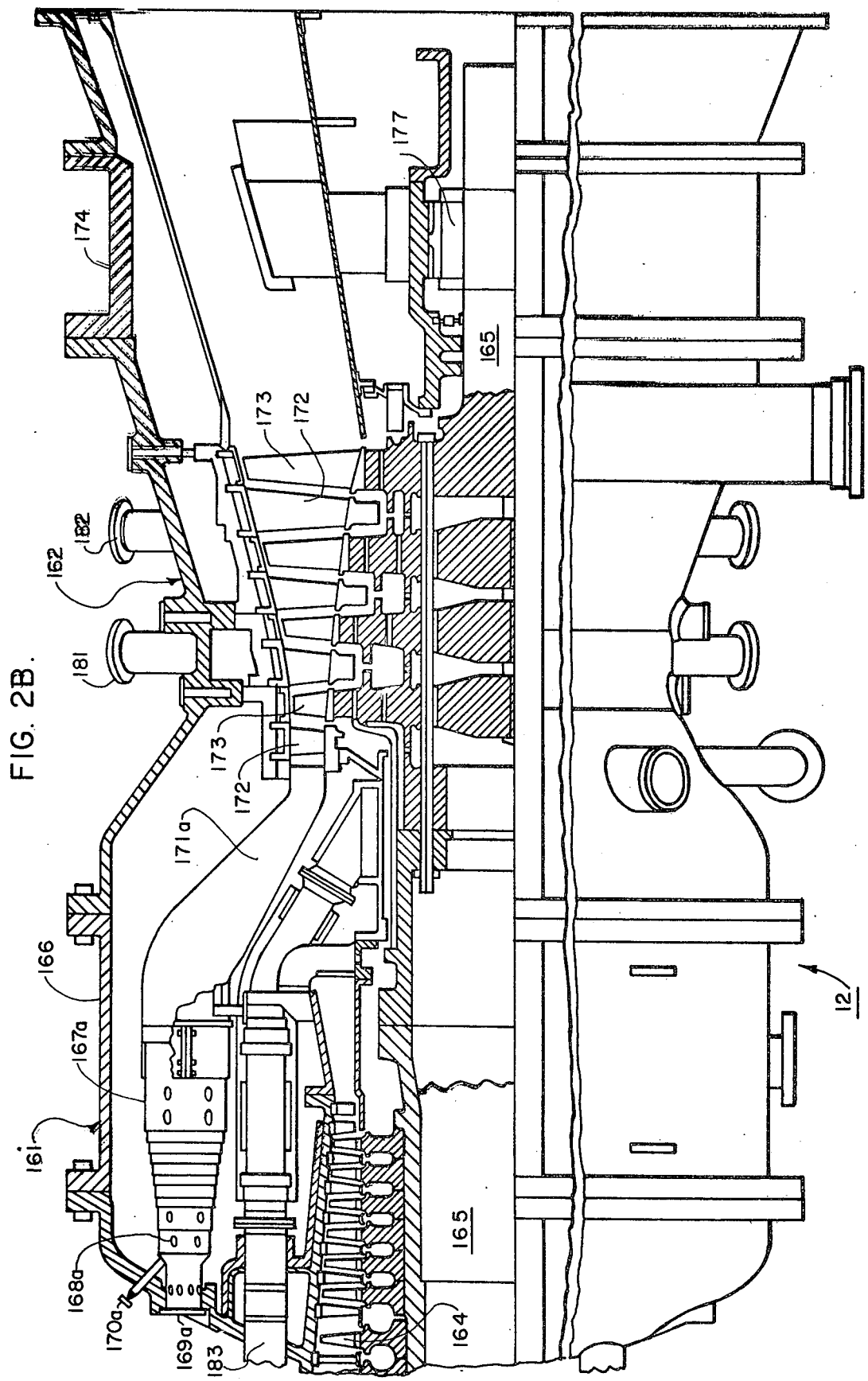

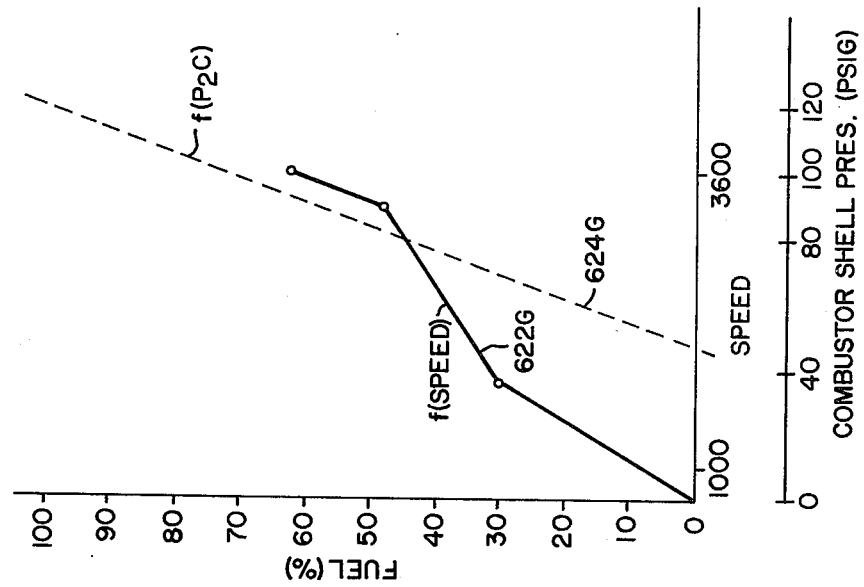
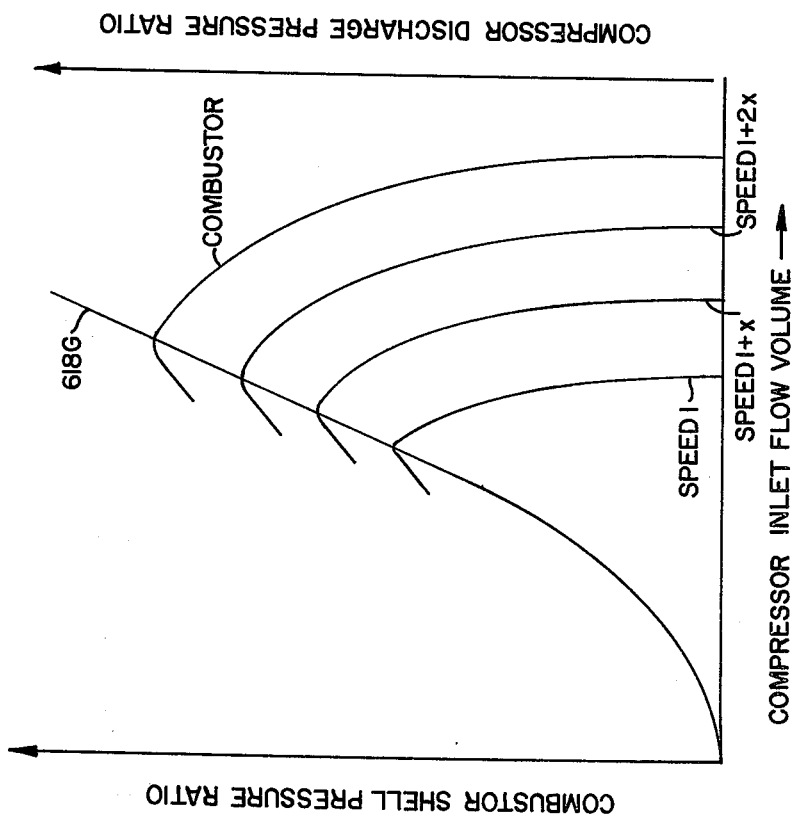

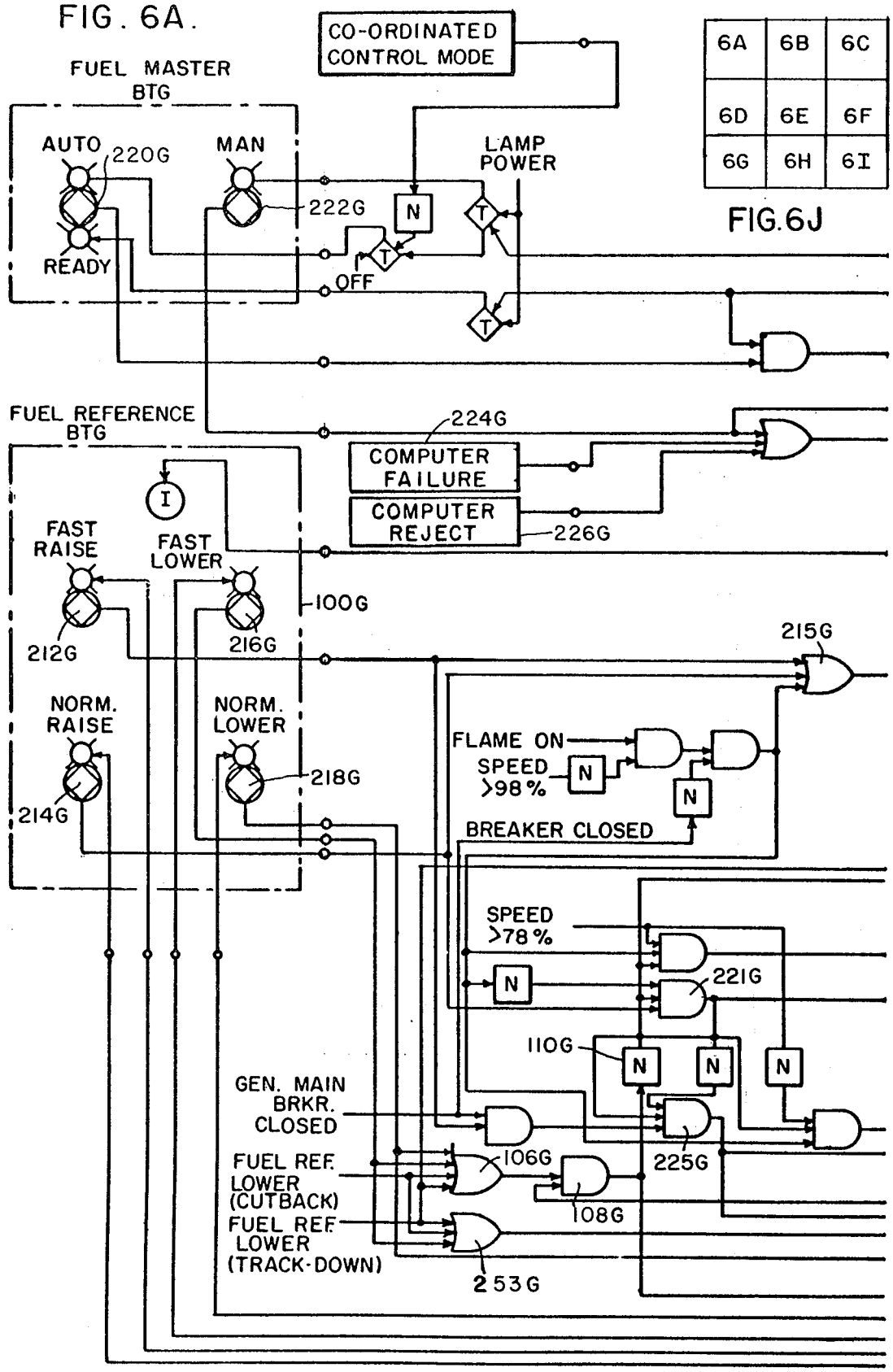

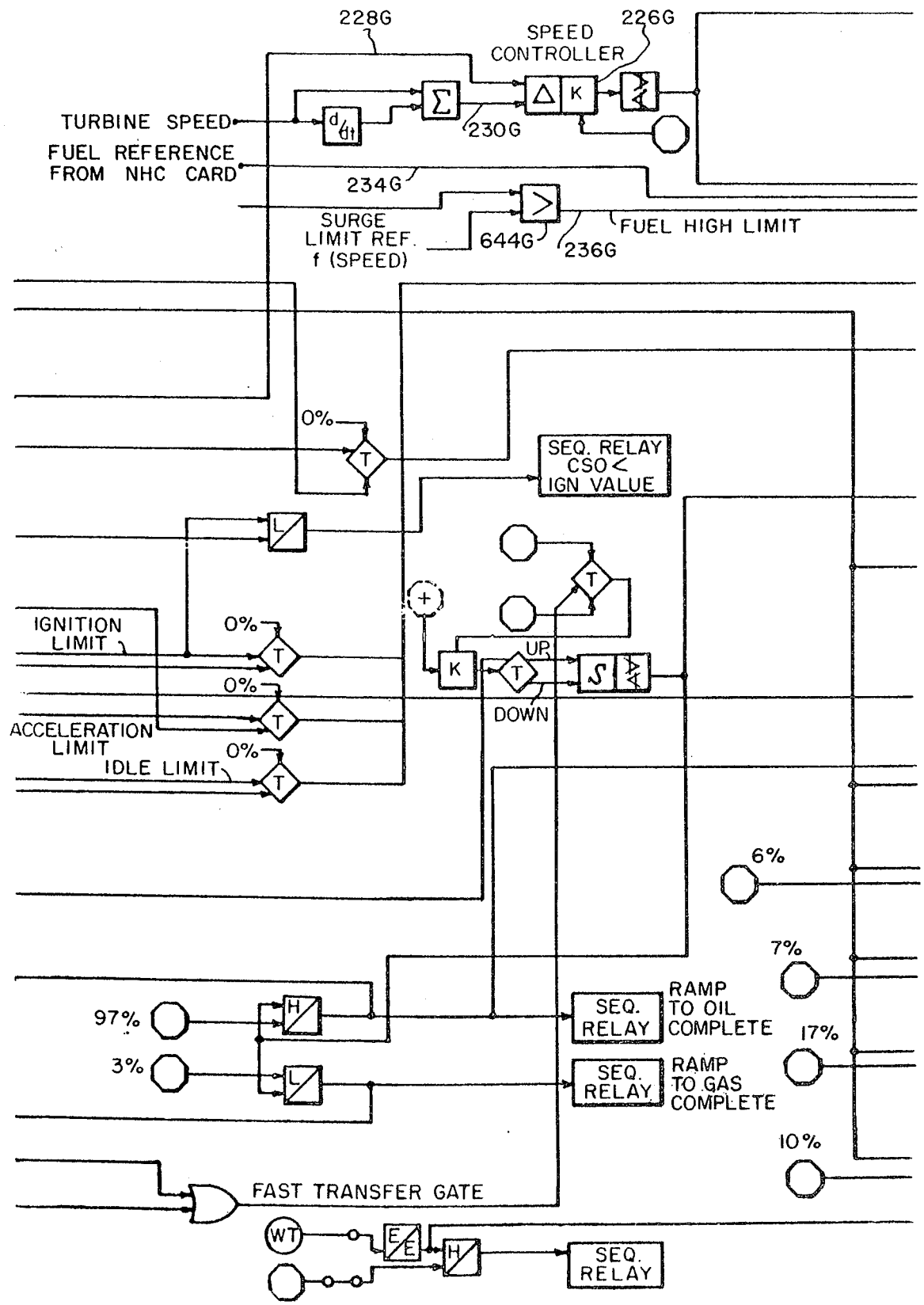

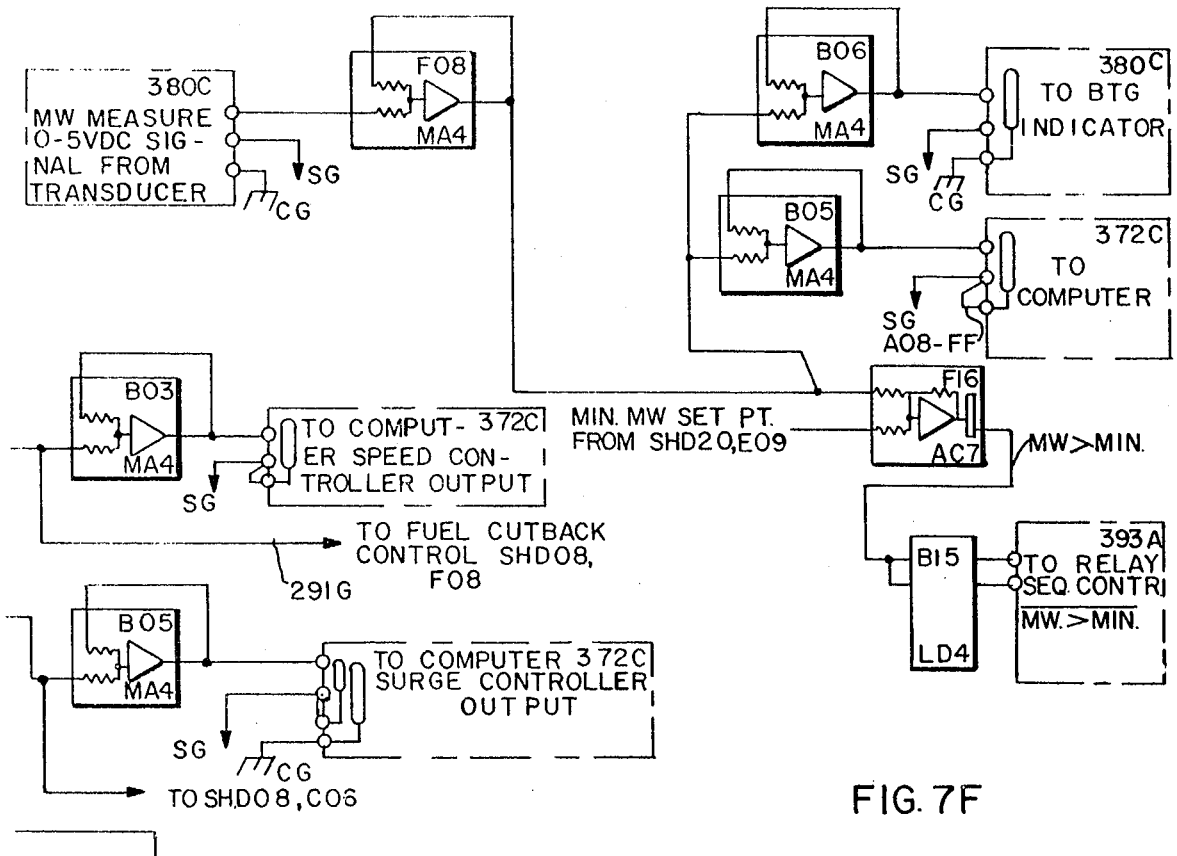
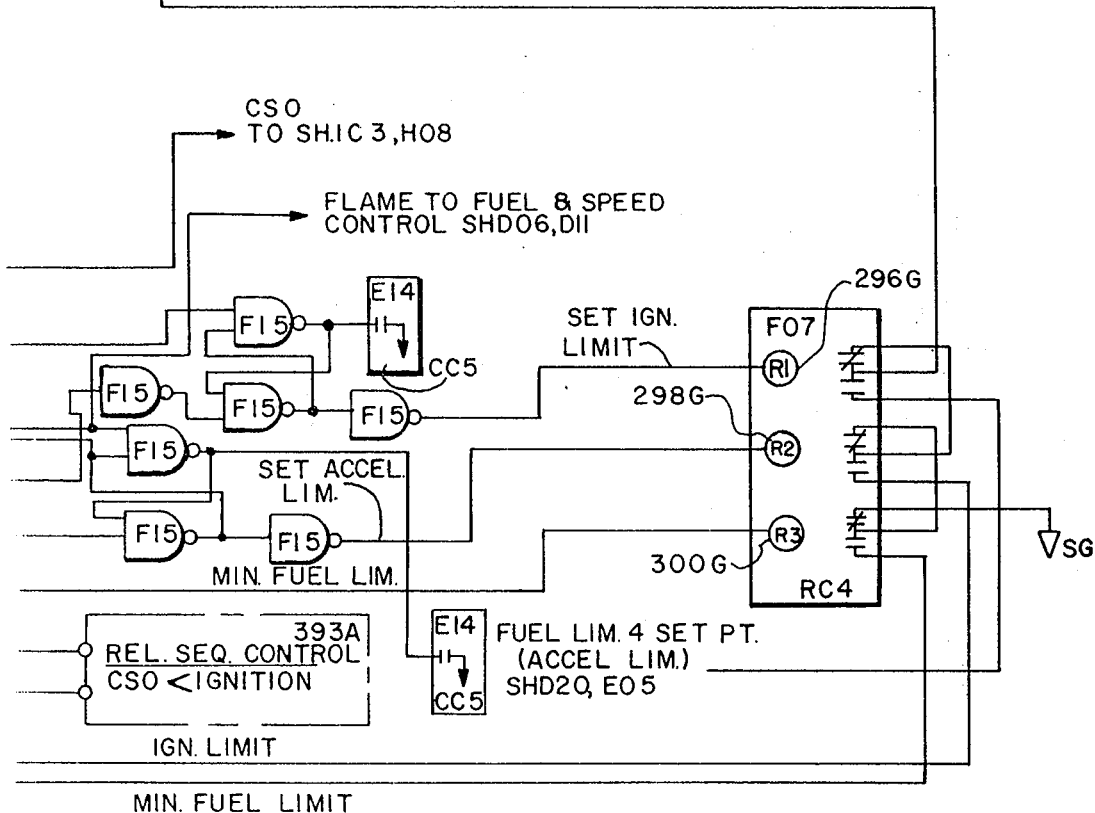
FIG. 7F

ELECTRIC POWER PLANT HAVING A GAS TURBINE WITH AN IMPROVED WIDE RANGE SURGE PROTECTION SYSTEM

CROSS REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor", assigned to the present assignee and hereby incorporated by reference.

2. Ser. No. 319,114, filed by T. Giras and J. Reuther on Dec. 29, 1972 as a continuation of an earlier filed application Ser. No. 082,470, now abandoned entitled "An Improved System And Method For Operating Industrial Gas Turbine Apparatus And Gas Turbine Electric Power Plants Preferably With A Digital Computer Control System" and assigned to the present assignee, and related cases referred to therein 3. Ser. No. 371,625, filed on June 20, 1973 by R. Yannone and R. A. Shields, entitled "Gas Turbine Power Plant Control Apparatus Having A Multiple Backup Control System", and assigned to the present assignee, and related cases referred to therein.

4. Ser. No. 495,765, filed concurrently herewith by Lyle F. Martz and Richard J. Plotnick, entitled "Combined Cycle Electric Power Plant Having a Control System Which Enables Dry Steam Generator Operation During Gas Turbine Operation", assigned to the present assignee and hereby incorporated by reference.

BACKGROUND OF THE INVENTION

The present invention relates to surge protection systems for operation in gas turbine power plants and more particularly to such systems for use in combined cycle electric power plants.

In combined cycle and other gas turbine electric power plants, which employ an axial flow compressor it is desirable to provide reliable protection against compressor surge since compressor operation under abnormal surge conditions can result in substantial equipment damage and substantial power generation downtime. Surge protection is provided in the first instance through proper compressor and turbine apparatus design so that surge conditions are not reached during normal operation.

Surge occurs when the compressor operates along its discharge pressure-inlet flow characteristic to the point where the discharge pressure drops below the combustor shell pressure. The compressor outlet flow then goes to zero and tends to reverse its direction, but shortly thereafter the flow condition is violently cleared when the combustor shell pressure bleeds down below the compressor discharge pressure. The compressor then returns to operation on its discharge pressure-inlet flow characteristic curve and, unless the process conditions causing the instability have been removed, the compressor discharge pressure again drops below the combustor shell pressure and the surge cycle is repeated.

Surge operation is a stalling operation of the compressor and it can be likened to an operation resulting from the closing and opening of a check valve in the compressor flow path. The period of the surge cycle is a function of the compressor discharge volume. One common method for defining the compressor surge line is to plot pressure ratio versus compressor inlet volume flow. On that plot, one surge point exists for every compressor speed. In gas turbine plants, the delivery pressure is the combustor shell pressure.

To prevent surge during startup, bleed valves are typically used to increase compressor inlet flow volume. Inlet guide vanes can also be positioned, especialy during startup, to control compressor inlet flow volume and thereby avoid surge.

Surge limit control loops have also been employed to limit fuel demand and thereby prevent overfiring which would result in surge. For example, in the above referenced patent application, Ser. No. 319,114, surge limit control is implemented with a digital computer as a function of combustor shell pressure. However, known surge protection systems have been limited in the reliability of protection provided over the wide range of speed and pressure involved in turbine operation from ignition to maximum load.

The description of prior art herein is made on good faith and no representation is made that any prior art considered is the best pertaining prior art nor that the interpretation placed on it unrebuttable.

SUMMARY OF THE INVENTION

An electric power plant includes gas turbine and generator apparatus and a control system which includes a fuel control for the gas turbine. A speed/load control generates a fuel demand for the fuel control, and a surge protection system limits the fuel demand as a function of speed over one range of operation and as a function of combustor shell pressure over another range of operation thereby providing reliable wide range surge protection.

BRIEF DESCRIPTION OF THE DRAWINGS

FIGS. 2A and 2B illustrate a gas turbine structure which can be employed in the plant of FIG. 1;

FIG. 5A shows the manner in which a compressor surge line is determined;

FIG. 5B shows a schematic representation of a surge reference curve generated in the operation of the surge protection system shown in FIG. 4;

DESCRIPTION OF THE PREFERRED EMBODIMENT

A. General Plant Description

Figure 1:
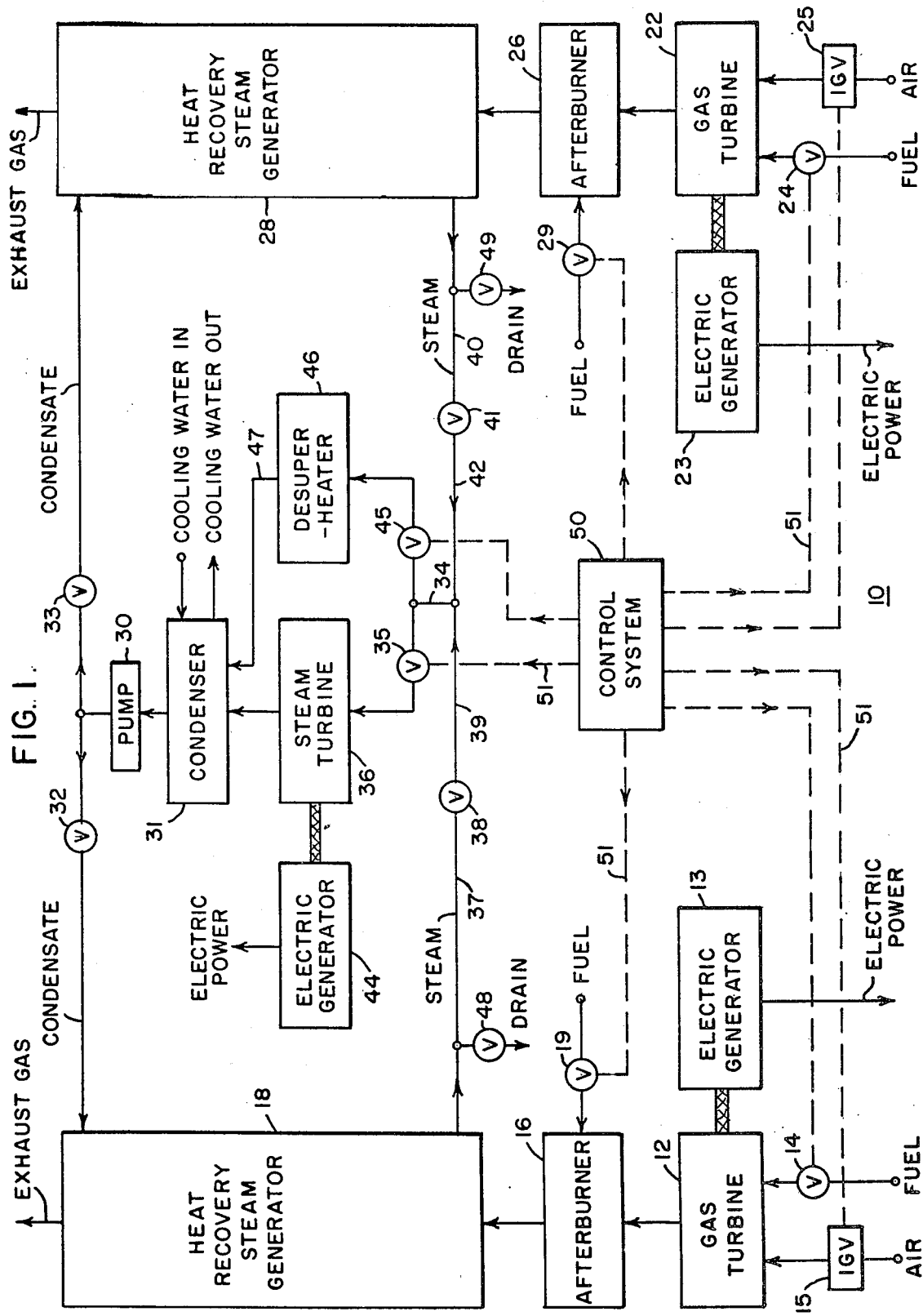
FIG. 1 shows a schematic view of a combined cycle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header of steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such ccondensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 31 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2A:
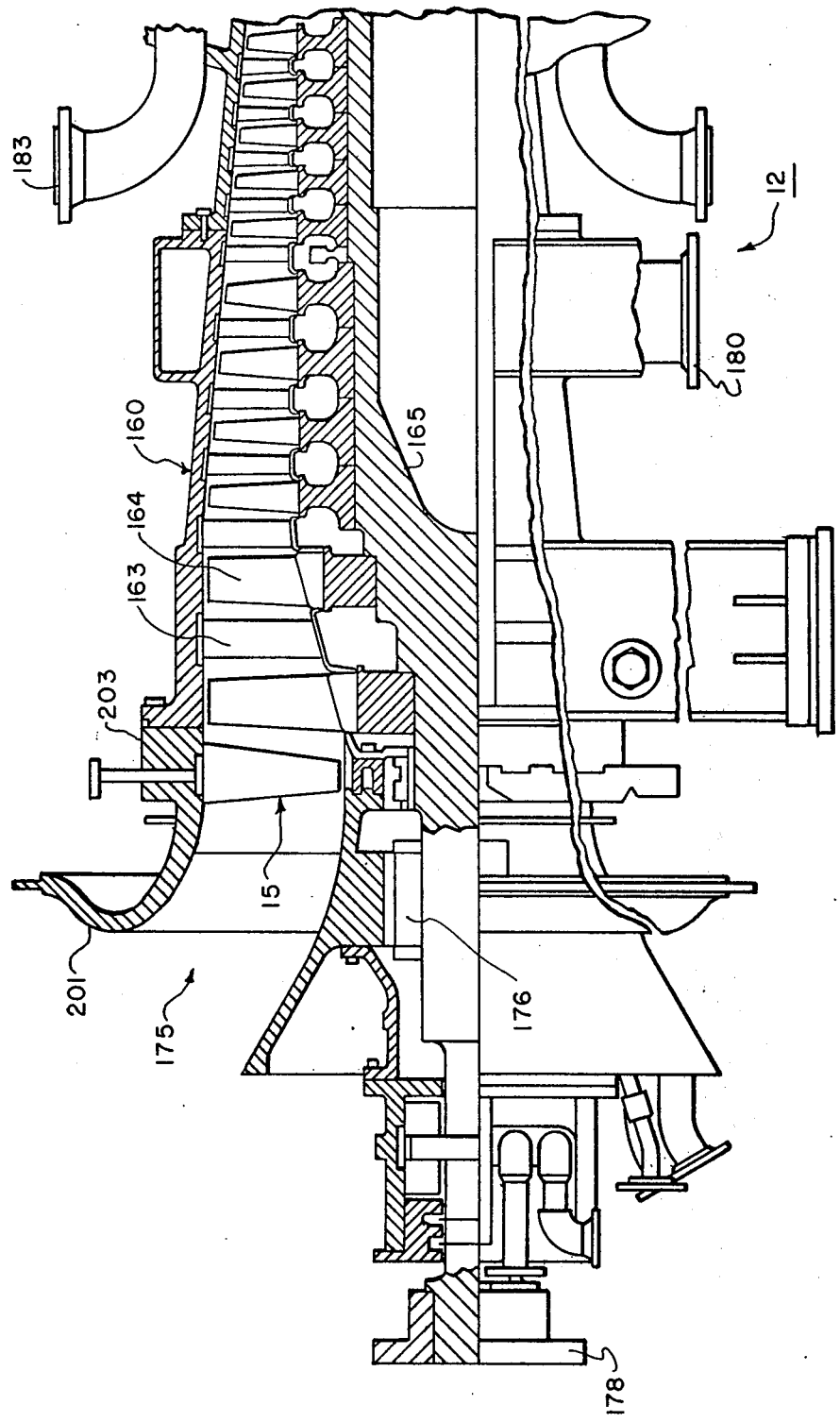

Referring now to FIGS. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pennsylvania. It is of the simple open cycle type and employs a single-shaft two-bearing construction in which no bearings are located in a high pressure, high temperature zone. It is constructed for operation at a rated speed of 3,600 rpm and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure high temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

C. Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
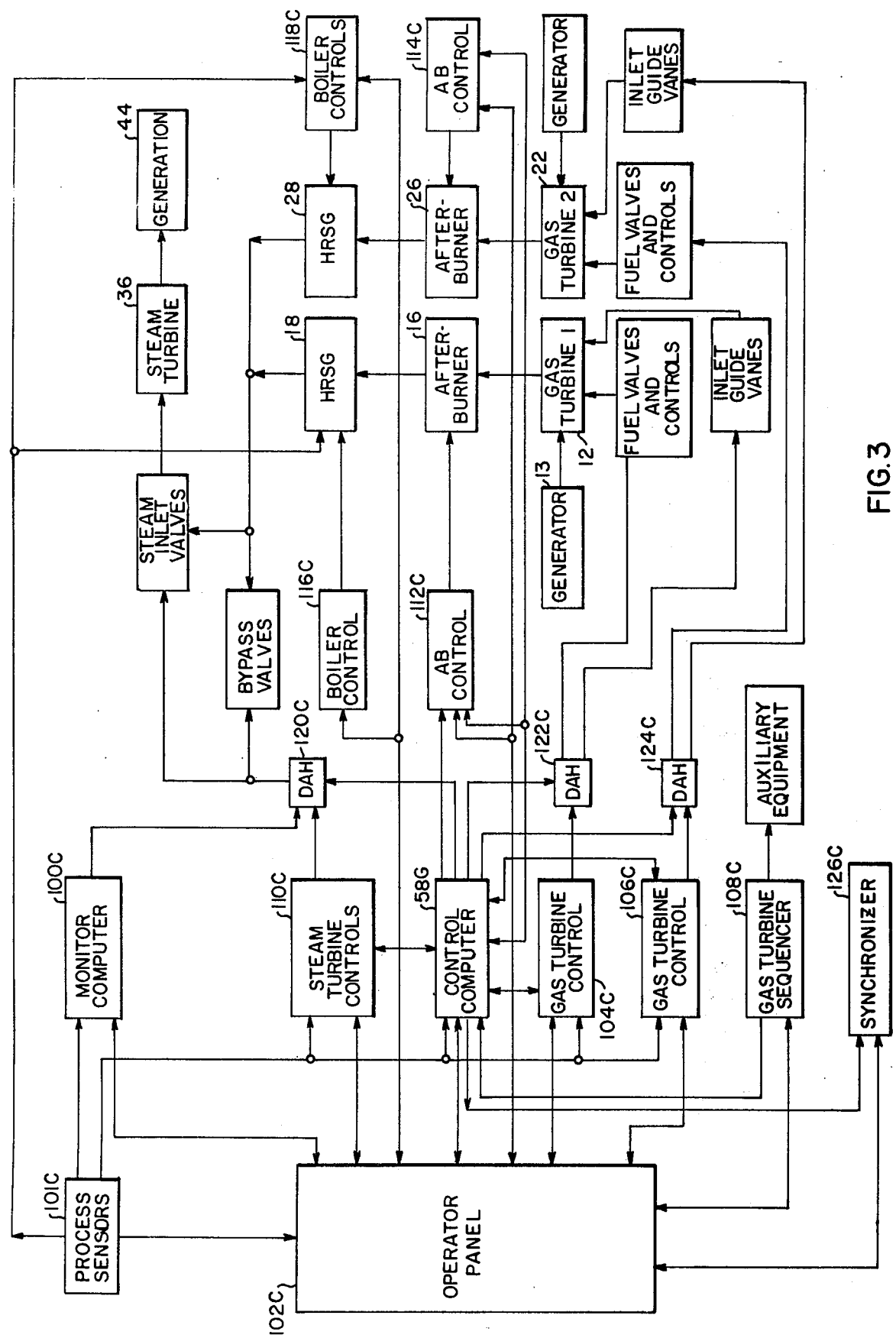
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. the pushbutton switches provide for numerous operator control actions including plant and turbine mode selections and setpoint selections.

In the operator analog or manual mode of operation, the operator sets the fuel level for the gas turbines 12 and 22 through gas turbine controls 104C and 106C during loading, but an analog startup control included in each of the gas turbine controls 104C and 106C automatically schedules fuel during gas turbine start-ups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves are positioned to operate the turbines at the demand load levels. The manner in which the control system 50 is configured and the manner in which it functions throughout startup and loading depends on the selected plant mode and the selected or forced plant configuration and the real time process behavior.

D. Surge Protection System

Figure 4:
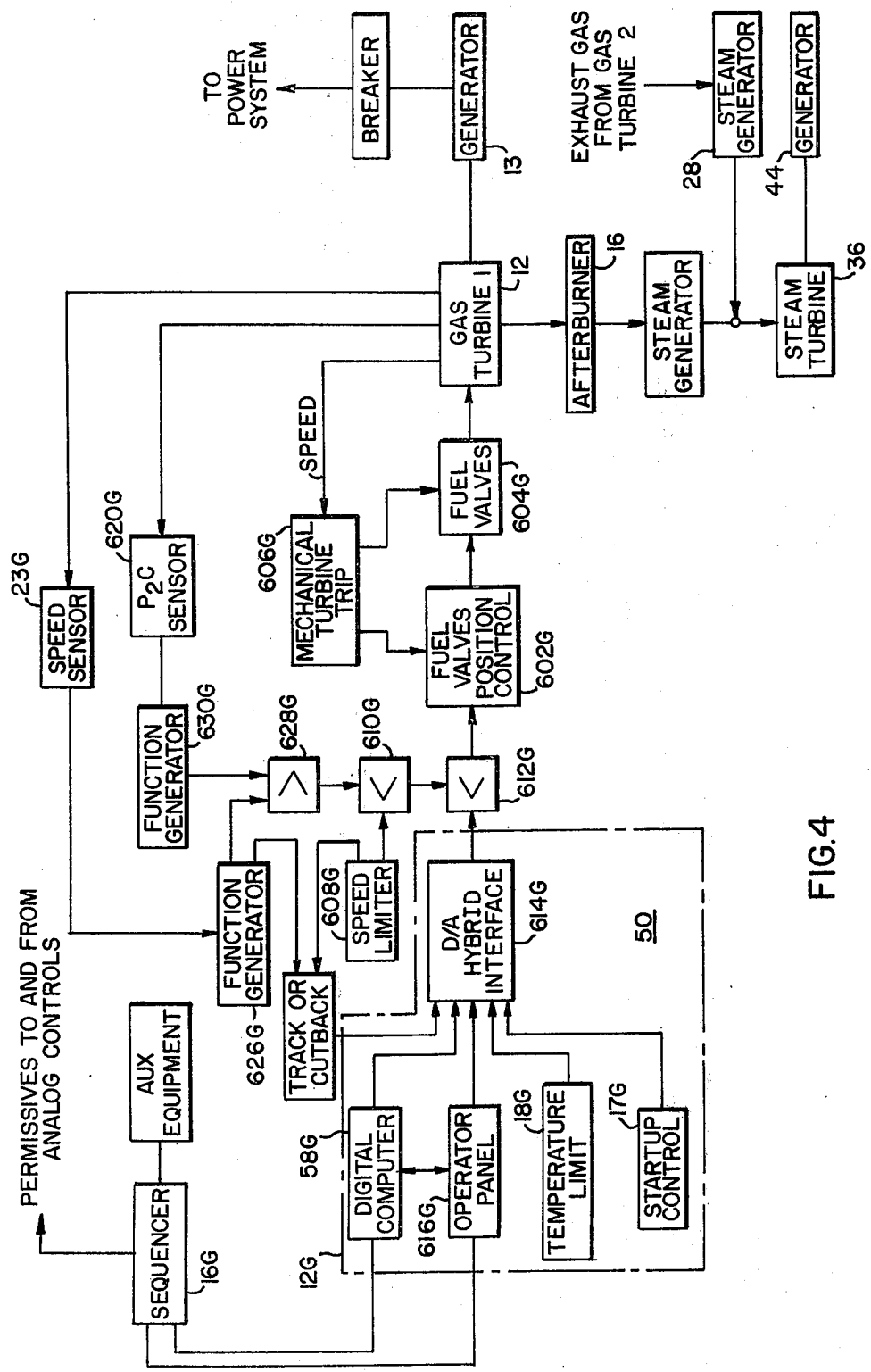
FIG. 4 shows a schematic diagram of the plant control system with element of a surge protection system illustrated to indicate more particularly the preferred manner of embodying the invention.

As shown in FIG. 4, the preferred embodiment comprises a surge protection system 600G which is included in the plant control system 50 to prevent the turbine 12 from operating at a level which results in compressor surge over the wide range of turbine operation from ignition to maximum load. Overfiring of the gas turbine which would lead to compressor surge is prevented by the application of a surge limit signal substantially directly on a throttle valve position control 602G which operates fuel valves 604G in controlling the flow of fuel to the turbine combustors.

A mechanical turbine trip apparatus 606G provides backup overspeed protection to prevent turbine speeds in excess of a predetermined value such as 111% of rated speed. An electrical overspeed protection system 608G limits turbine overspeed during both the automatic and manual modes of operation by placing an electric limit signal substantially directly on the throttle valve position control 602G. A low selector block 610G transmits the lowest of the surge and overspeed limit signals, and another low selector block 612G in turn transmits the lowest of that low selected signal and a fuel reference signal generated at the output of a digital/analog hybrid interface block 614G. The hybrid fuel reference generally provides for turbine speed/load control when it is not limited by other controls for turbine protection purposes.

The manual/automatic status of the plant control system 50 is fixed by operator selection at an operator panel 616G or by a computer rejection to manual. The digital/analog hyrbid interface 614G includes manual/automatic logic circuitry to detect when the gas turbine 12 is to be on backup or manual control and to make switching operations which implement the applicable control load.

A speed/load control 12G includes a programmed digital control computer 58G which generates a fuel reference from the hybrid interface in the coordinated and the operator automatic modes during speed and load control. The computer 58G further initiates turbine startup by a sequencing system 16G under coordinated control. Generally, the sequencer 16G sequences the gas turbine 12 through the startup process by starting and stopping auxiliary equipment when sequencing permissives are generated, and it trips the turbine if certain conditions develop. Further, the sequencer 16G generates logicals for the turbine controls, i.e. a master relay on signal, a fuel on signal, a breaker status signal, a fuel select and transfer signal, and a flame on signal.

In the operator analog or manual mode, the operator controls the turbine loading operation by generating a fuel reference from the hybrid interface 614G and a startup control 17G generates a fuel reference from the hybrid interface during startup. A temperature limit control 18G functions during the operator analog or manual mode to limit the turbine blade path or exhaust temperature by imposing a limit on the fuel reference.

During startup, the turbine is accelerated through ignition speed to synchronous speed under control of the computer 58G or the analog startup control 17G and the sequencer 16G. The generator 13 is then synchronized to the line and the breaker is closed and the turbine is loaded with further increases in the fuel flow. Compressor surge can occur during startup or load operations, i.e. over the wide range of operations from ignition to maximum load which typically involves pressure ratio changes from 1.1 to 10 and speed changes from 900 rpm to 4,000 rpm. The surge limit control 600G functions in all modes of operation directly through the fuel valve position control 604G to limit the hybrid fuel reference for the purpose of avoiding surge conditions.

In the operation of the surge protection system 600G, the speed/load control 12G generates a fuel reference during startup and during load operation and normally the system functions to the right of the characteristic surge line such as the surge line 618G in FIG. 5A. Thus, the turbine is accelerated under automatic or backup control to synchronous speed by a fuel reference and once synchronization occurs the turbine speed is regulated in the load mode by the system frequency. A turbine speed signal is generated by a sensor 23G and a combustor shell pressure signal is generated by a sensor 620G for use in developing the surge limit control signal.

As shown in FIG. 5B, a surge function 622G is generated as a function of speed, and another surge function 624G is generated as a function of combustor shell pressure. During startup, the speed surge function is generated by block 626G and it is high selected by a monitor block 628G to operate as the surge limit signal in the downstream selection process previously described. The turbine compressor normally functions without surge limit control action and the surge control system is so calibrated that at any operating condition at which surge limit control action does occur the compressor is functioning at a safe distance from its surge line.

At a higher turbine operating level, i.e. at a preselected crossover point well below the surge line or in this case preferably at about 80% of synchronous speed, a block 630G, operating in accordance with the pressure surge function, generates a higher signal than does the block 626G and it is accordingly high selected as the surge limit signal by the high monitor block 628G. At higher speeds and under load operation up to the maximum load, the block 630G generates the surge limit signal. To achieve the described surge functions, the block 630G can be a proportional block with a predetermined gain and the block 626G can be a conventional function generator with an output like that shown in FIG. 5B. If a surge limit condition is detected from the measured turbine speed or combustor shell pressure, and if the resultant high selected surge limit signal is low selected over the overspeed limit signal and the speed/load fuel reference signal, the surge limit signal then directly causes a reduction in the fuel supply to the turbine 12 by cutting back on the fuel reference signal applied to the fuel valve position control 602G.

In summary of the surge protection system operation, protection is provided for the compressor against surge by limiting the turbine fuel input with a signal that is a function of speed during startup and a function of combustor shell pressure during higher speed and during load operation. Failsafe features are provided preferably by selecting the higher of two speed transducer signals (not specifically shown in FIG. 4) and by selecting the higher of the speed limiting or combustor shell pressure limiting signals. If the combustor shell pressure transducer fails low while operating in the load mode, the load will be decreased on the speed curve which corresponds to approximately 60% fuel. The protection system is highly accurate over a wide operating range because of the employment of the speed signal at low speeds and the employment of combustor shell pressure at higher speeds and during the load mode of operation. Thus, the speed and pressure transducers are used in their ranges of highest accuracy. Further, the surge protection system functions in both automatic and backup modes without any transfer requirement. The system is stable and non-interacting with other systems because the speed and combustor shell pressure feedback variables are directly affected by fuel limit actions. Reliability is enhanced for the system by the relative simplicity of the system structure with a relatively small number of circuit components.

SYSTEM FUNCTIONS

Figure 6B:
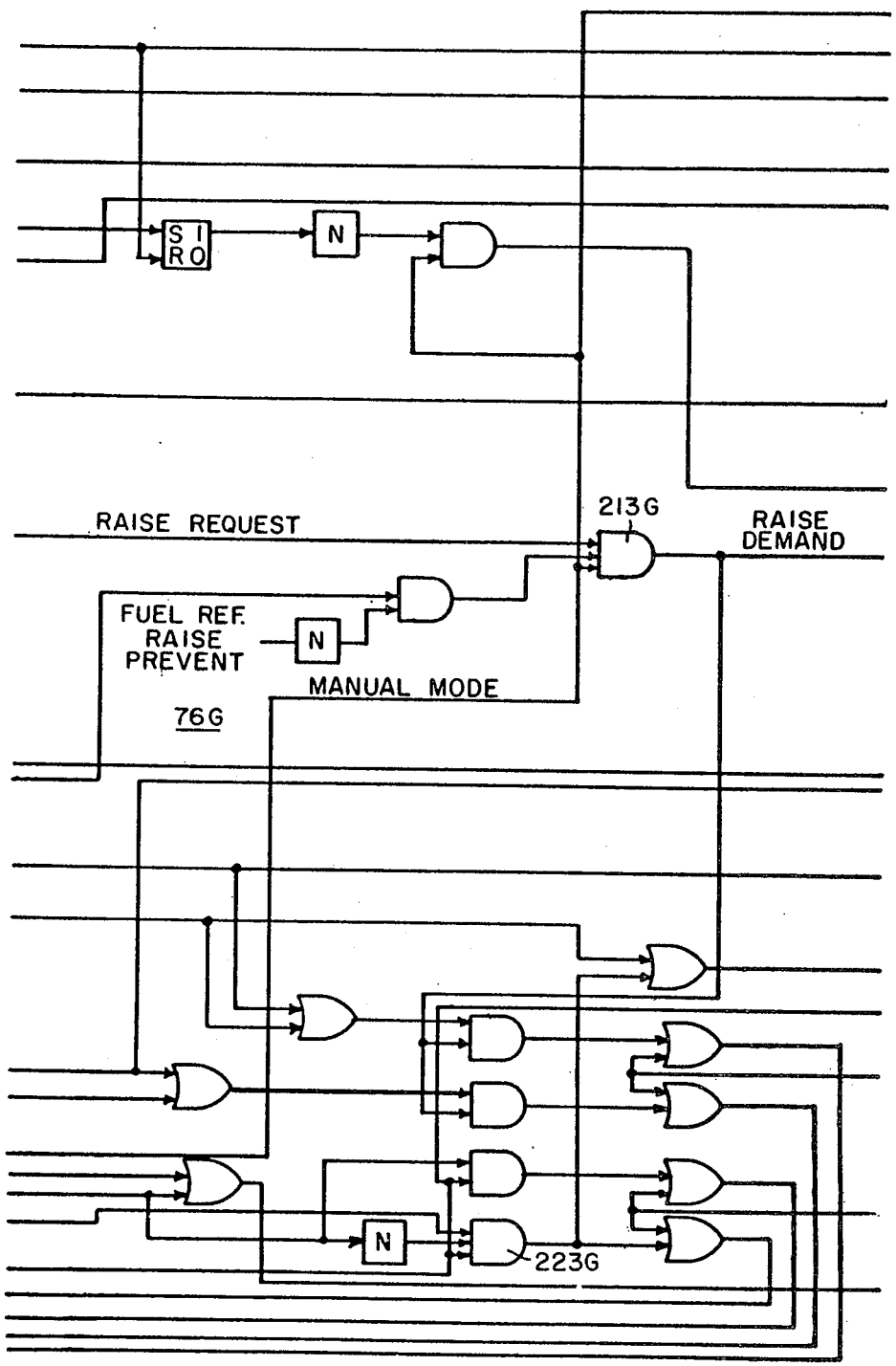
FIGS. 6A through 6I show a more detailed functional diagram of the surge protection system and FIG. 6J shows how these figures are tied together.
Figure 6C:
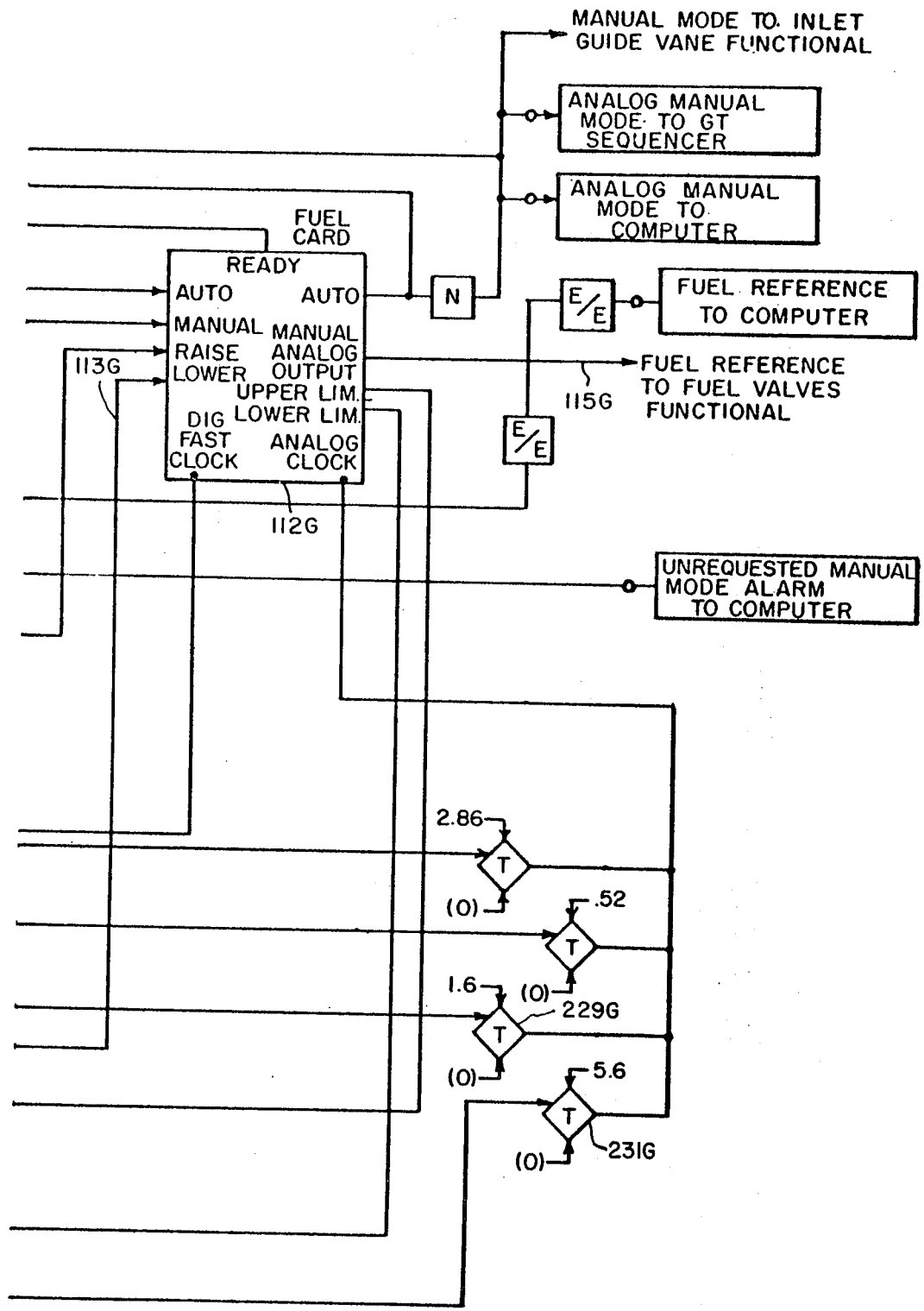

As shown in more functional detail in FIGS. 6A–6C, a fuel reference is generated by the NHC hybrid interface card 112G as indicated by the reference character 115G. Fast and normal raise and lower pushbuttons 212G, 214G, 216G and 218G in box 100G on the operator panel function through RAISE AND and OR blocks 213G and 215G and LOWER AND and OR blocks 217G and 219G to apply inputs to the NHC card 112G which enable the fuel reference to be raised or lowered in the operator analog or manual mode. The normal raise and lower pushbutton signals are also applied to AND blocks 221G and 223G which cause an analog output to set a normal ramp through the NHC clock for as long as the pushbutton is depressed. Similarly, fast raise and lower signals generate a fast ramp through AND block 225G and OR block 227G. Switches 229G and 231G are operated to generate the normal and fast ramp control signals. In the automatic mode, the computer 58G applied signals to the NHC card 112G to generate the output fuel reference from the NHC card 112G.

The automatic mode is selected by a pushbutton 220G if a computer READY signal is received from the NHC card 112G. The system functions in the manual or operator analog mode if a manual pushbutton 222G is pushed or if the computer rejects to manual as indicated by boxes 224G and 226G. Generally, the NHC card 112G responds to the automatic and manual mode signals to interface the manual mode control loops with the automatic mode control loops and to couple these loops with continuously functioning downstream control loops and the downstream fuel valve control.

Figure 6D:
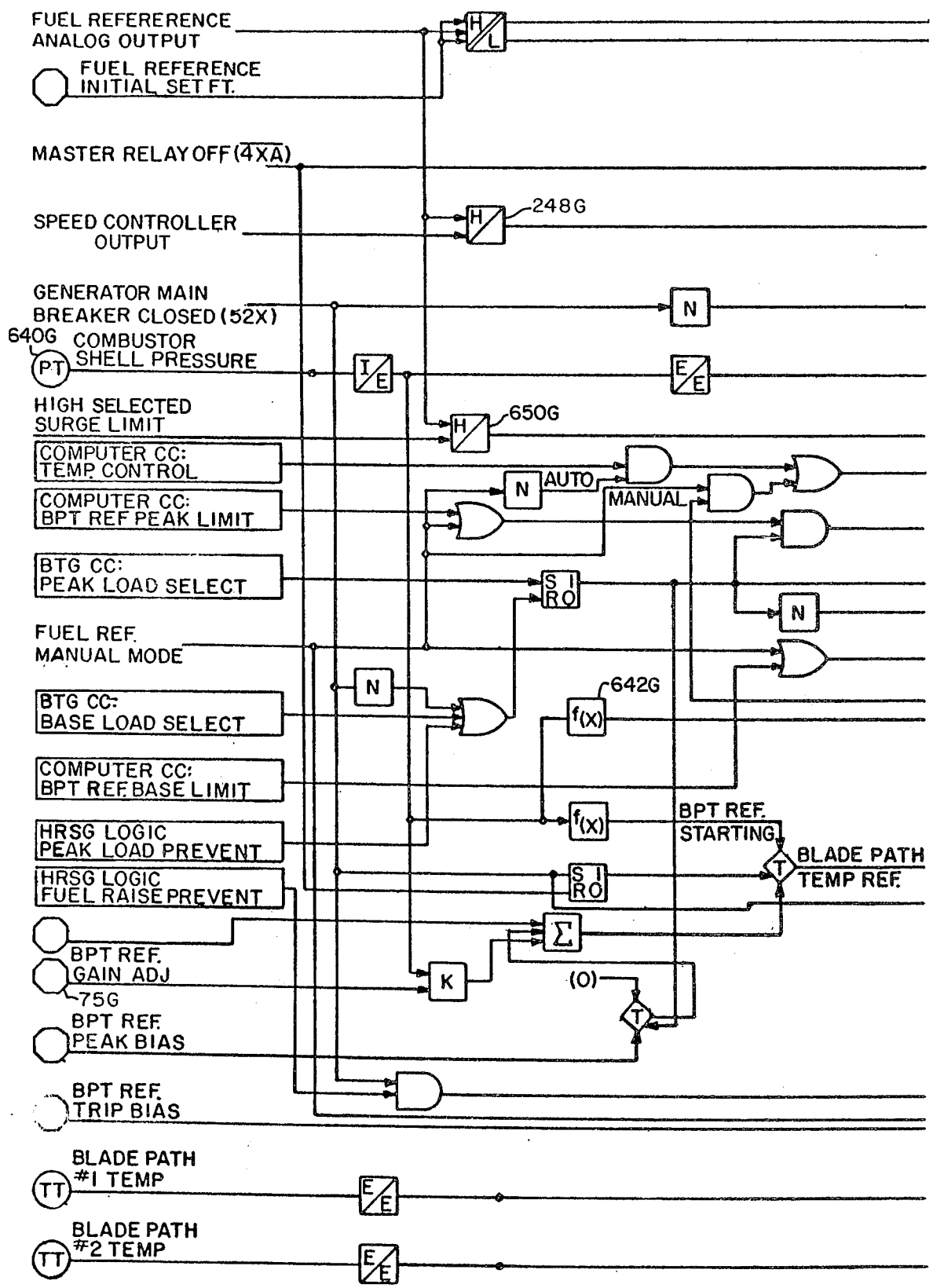
Figure 6E:
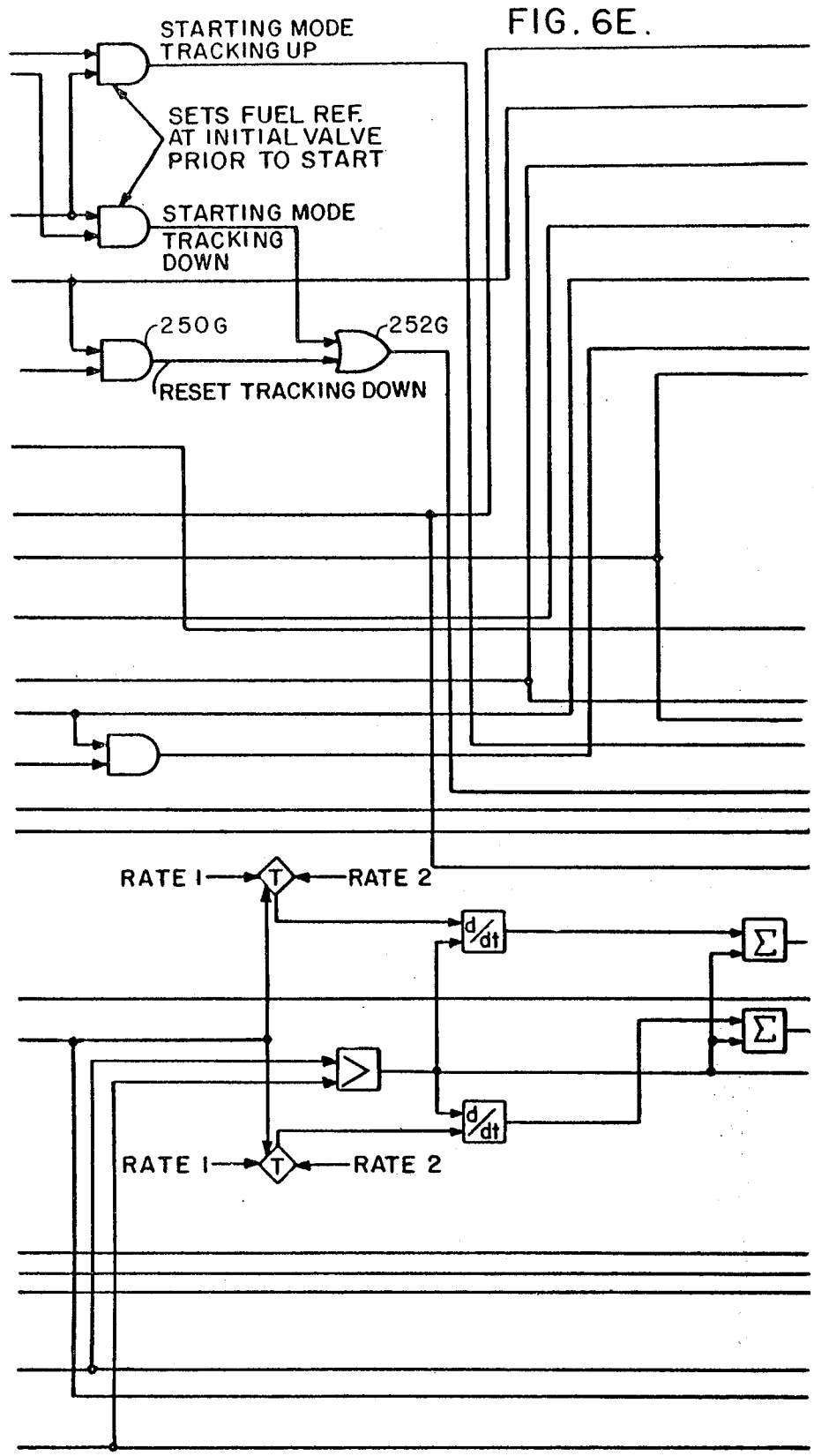
Figure 6F:
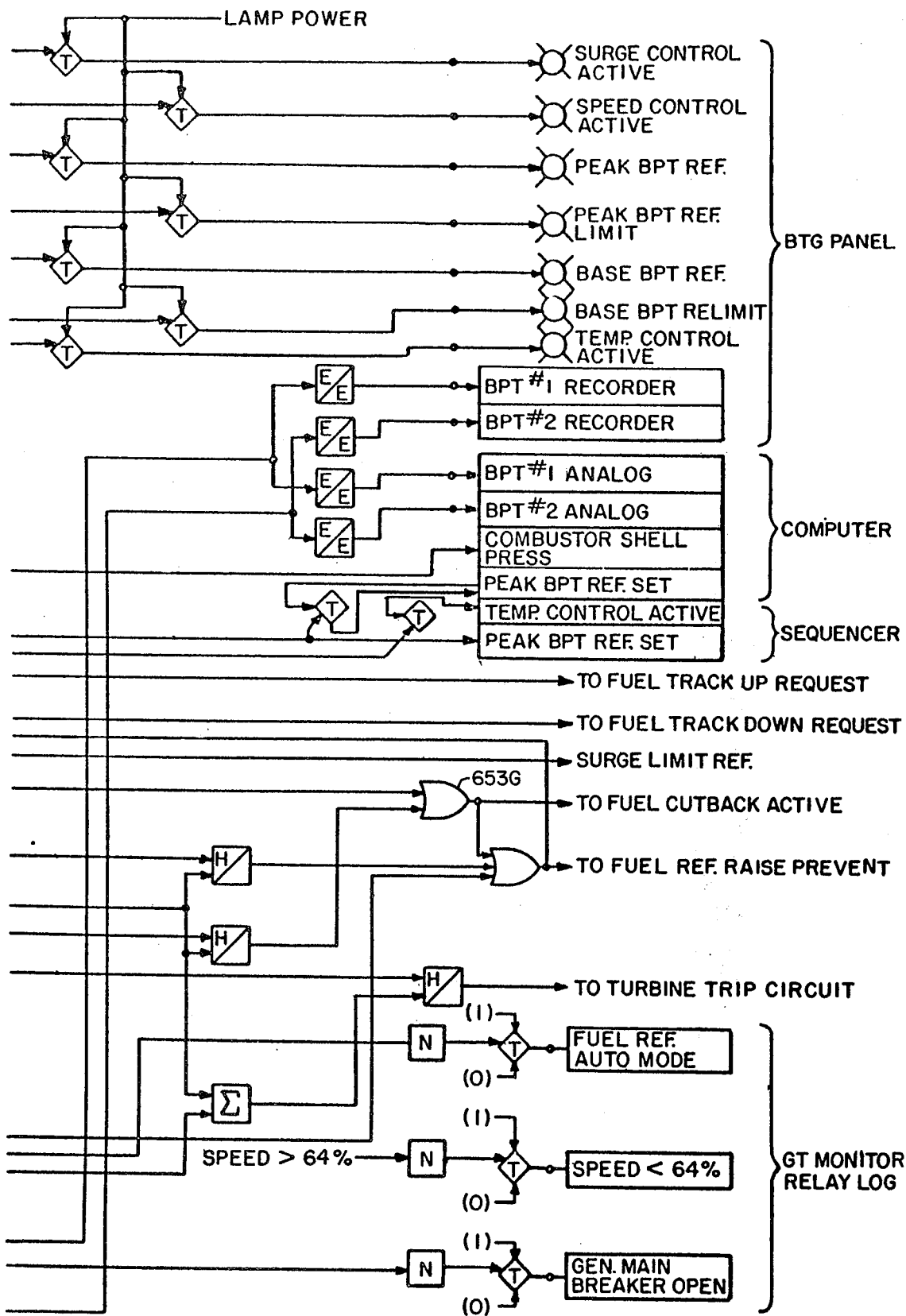
Figure 6G:
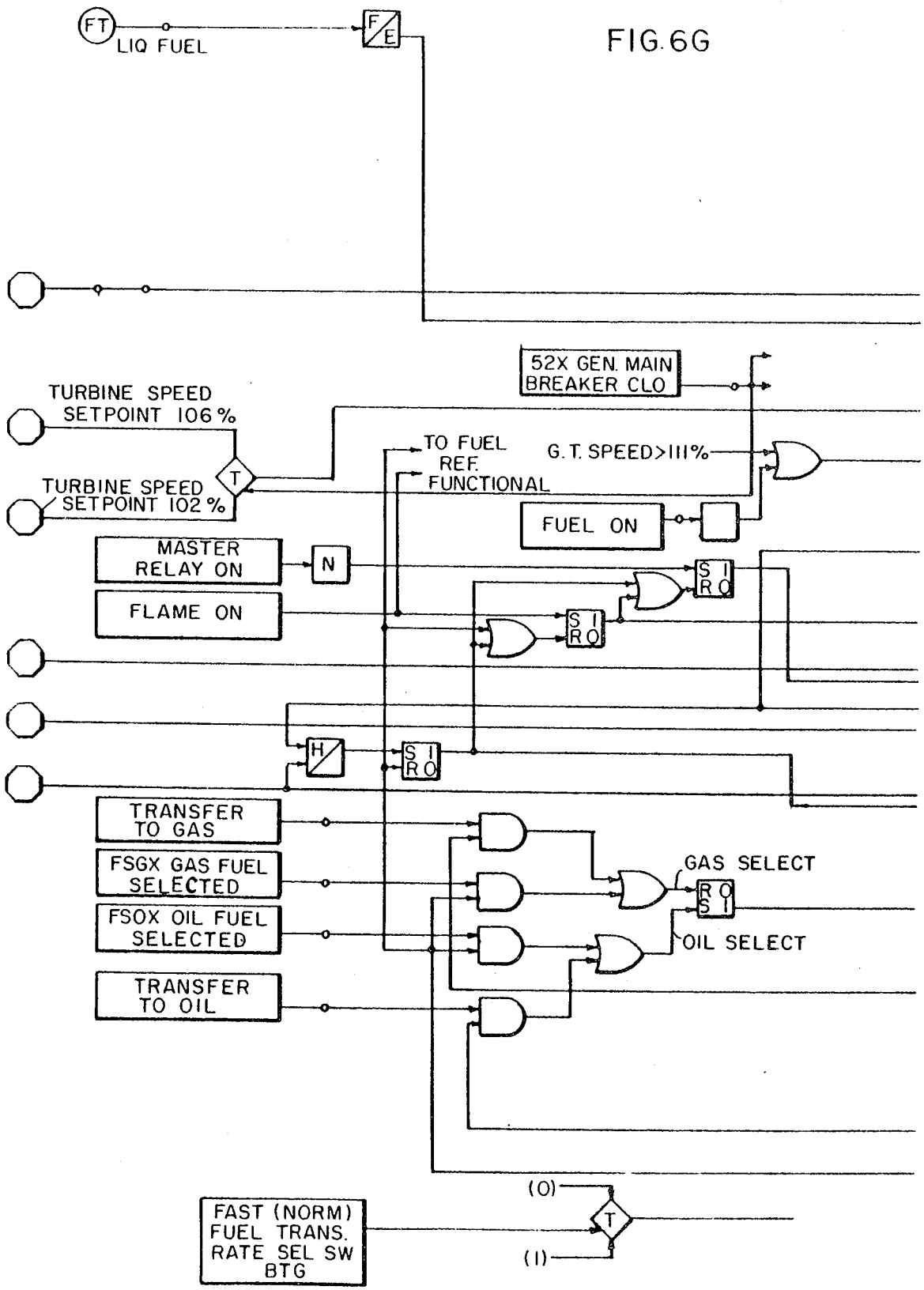
Figure 6I:
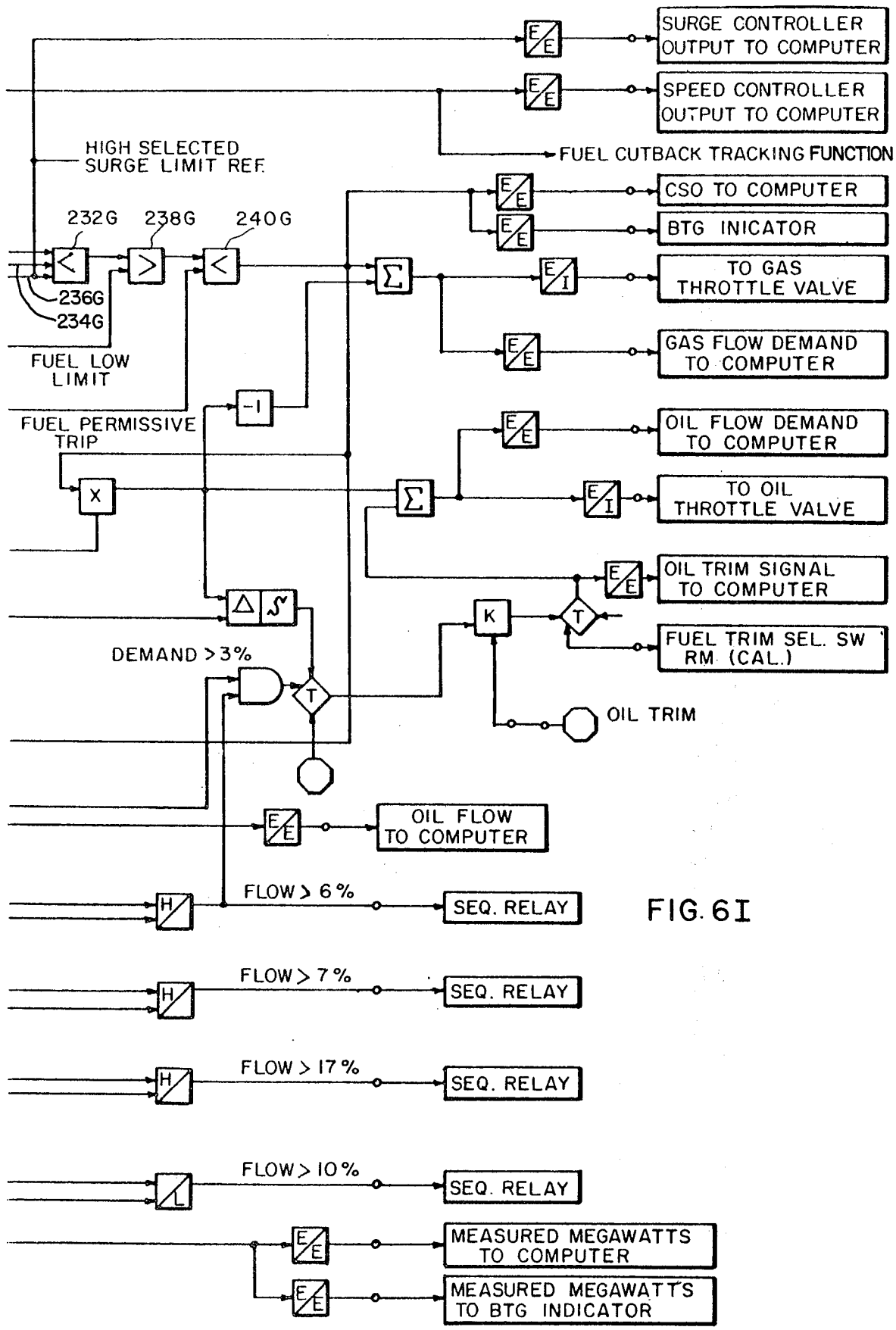

As shown in FIGS. 6G–6I, the electrical overspeed protection system 608G includes a proportional controller 226G which compares a turbine speed setpoint of 102% or 106% as indicated by the reference character 228G with a signal representing the sum of the actual speed and, for purposes of quick corrective response to speed errors, the derivative of the actual speed as indicated by the reference character 230G. The proportionality constant of the controller can be baried to vary the regulation from 2% to 8% as indicated in the drawing. The output of the speed controller 226G is checked for high and low limits and applied to a low selector 232G along with the fuel reference from the NHC card 112G as indicated by the reference character 234G and an output from the surge limiter indicated by the reference character 236G. The smallest of the three input signals is selected by the low selector 232G and generated at its output. A high selector 238G prevents the fuel reference from falling below a value required for avoiding outfire, and a low selector 240G prevents the fuel reference from exceeding a predetermined high limit value. The output fuel reference signal is then applied to a fuel transfer control and ultimately as a position reference the gas and oil throttle valve controls.

For more detail on the electrical overspeed protection system 608G, reference is made to copending and coassigned patent application Ser. No. 495,739, "A Combined Cycle Electric Power Plant And A Gas Turbine Having An Improved Overspeed Protection System" and filed by J. Smith and T. Reed concurrently herewith.

Figure 6J:
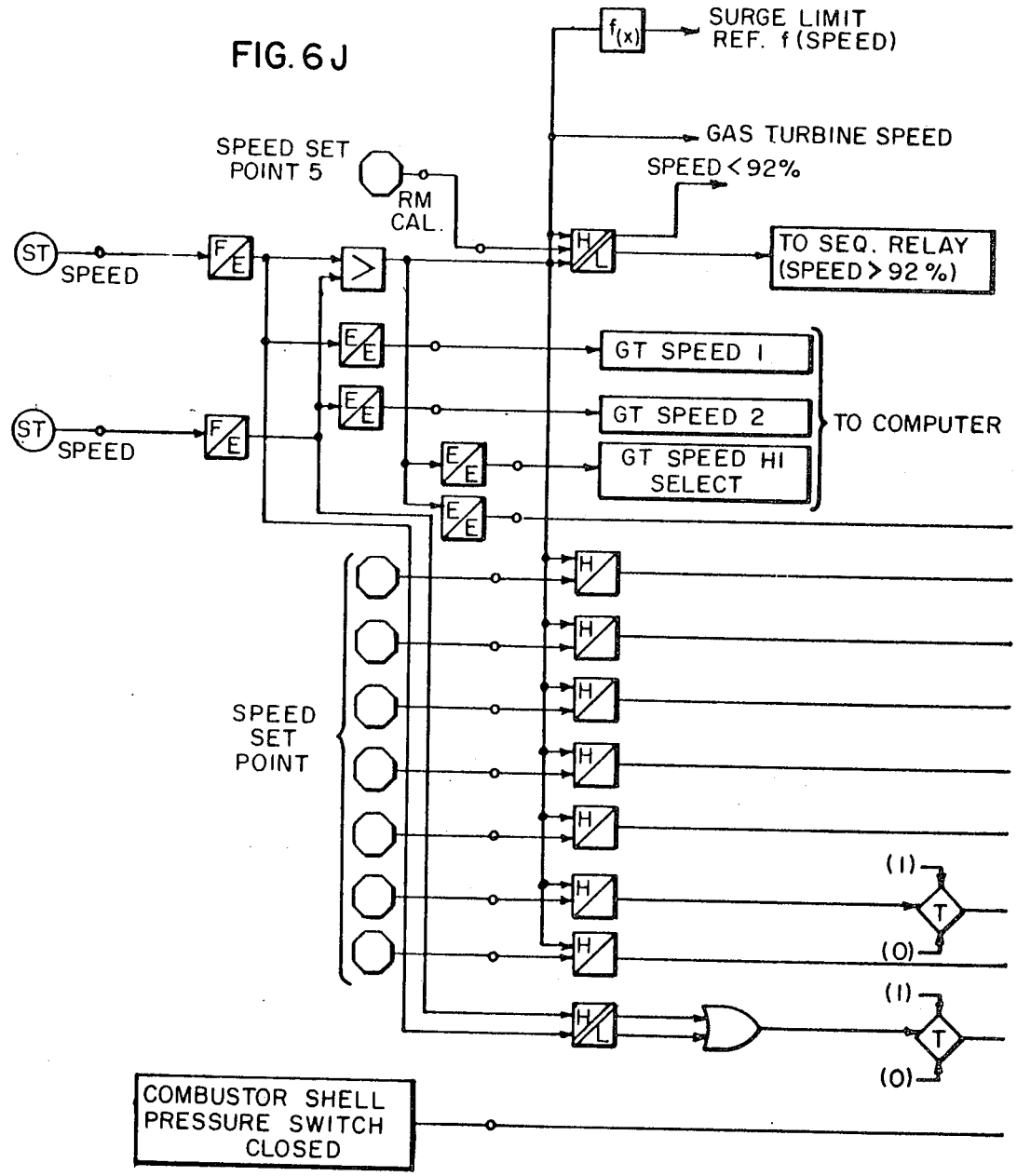
Figure 6K:
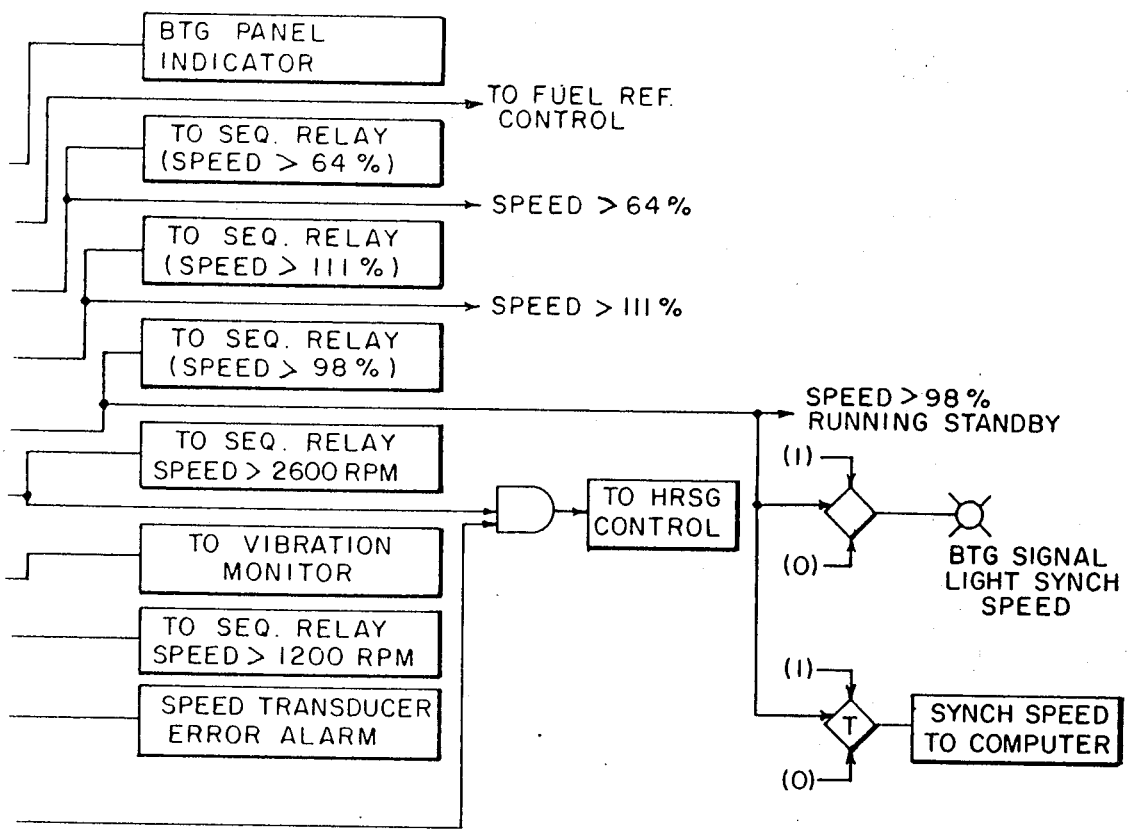

In the surge protection system, the combustor shell pressure signal is applied from a sensor 649G (FIG. 6D) to a function generator 642G to generate the higher range surge limit signal for application to a surge high selector 644G (FIG. 6H). As shown in FIG. 6J, a high selector 646G transmits the higher of two feedback speed signals and applies the output to a function generator 648G to generate the lower range surge limit signal for application to the surge high selector 644G (FIG. 6H).

In order to track or cut back the actual fuel reference signal when the overspeed or surge protection loop becomes active, the NHC fuel reference output is compared with the speed controller output in a high signal monitor 248G and with the high selected surge limit reference in a high monitor 650G (FIG. 6D). If the fuel reference is higher than the speed limit signal, a fuel reference track down signal is generated by an AND block 250G through an OR block 252G and applied to an OR block 253G (FIG. 6A) to set a fast analog fuel lower rate through the NHC clock and to cause a cutback in the NHC fuel reference through an OR block 106G. If the fuel reference is higher than the surge limit signal, a fuel reference cutback signal is generated by OR block 653G through OR block 106G. The fuel reference lower track down signal also operates as a digital or logical trigger for fast clock operatin the NHC card 112G.

A track down signal from the OR block 106G or a cutback signal from the OR block 653G causes a cutback demand to be generated by the AND block 108G if the system is in the operator analog or manual mode (FIG. 6A). If the system is in the automatic mode, similar tracking occurs through the computer 58G to cause the NHC fuel reference output to track the speed limited fuel reference.

The NOT block 110G processes the temperature track down or surge cutback output of the AND block 108G to generate the lower signal in the NHC card 112G as indicated by the reference character 113G. The output of the AND block 108G is also coupled to display logic to indicate any track down or cutback activity. Accordingly, when the surge protection system becomes active to cut back the fuel reference applied to the throttle valve control, the output fuel reference from the NHC card 112G is caused to be cut back until the surge limit condition is removed. In this manner, a return is made to automatic or manual NHC card control in a bumpless manner when the surge limit loop becomes inactive with a removal of the surge limit condition.

DIGITAL/ANALOG HYBRID COUPLER (NHC) CARD

Figure 8:
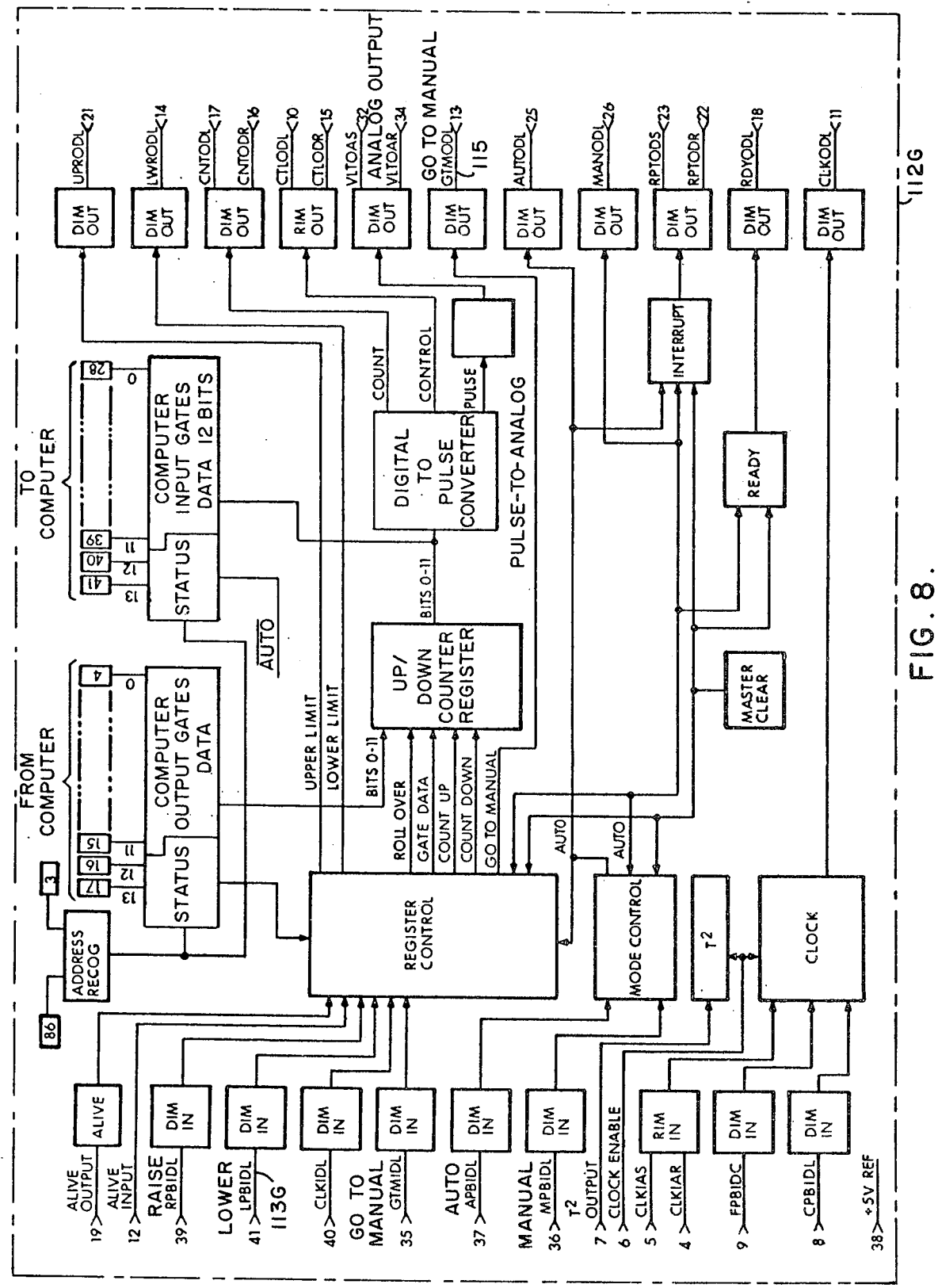
FIG. 8 shows a schematic diagram of a circuit card which provides hybrid interface between the digital computer circuitry and the analog circuitry employed in the gas turbine control system.

As shown in greater detail in FIG. 8, the fuel reference raise and lower signals are applied to the input of an NHC register control which causes an up/down register to count up or count down according to whether a raise demand or a lower demand is in effect. On hold operation, an operator raise request is defeated, and on a cutback operation or a track down operation, a fuel reference lower demand is generated at the input of the register control to cause the register to count down. The register output is converted to pulses which in turn are converted to an analog output for application as a fuel reference to the fuel valve control as indicated by the reference character 115G.

The NHC card 112G converts a 12 bit binary number from the computer to an analog output signal. This card operates in either the manual or the automatic mode. In the automatic mode, the NHC card output can be set or read by a computer peripheral channel. In the manual mode, the NHC card output is controlled by signals generated outside the computer which raise or lower the output.

SYSTEM CIRCUITRY

Figure 7A:
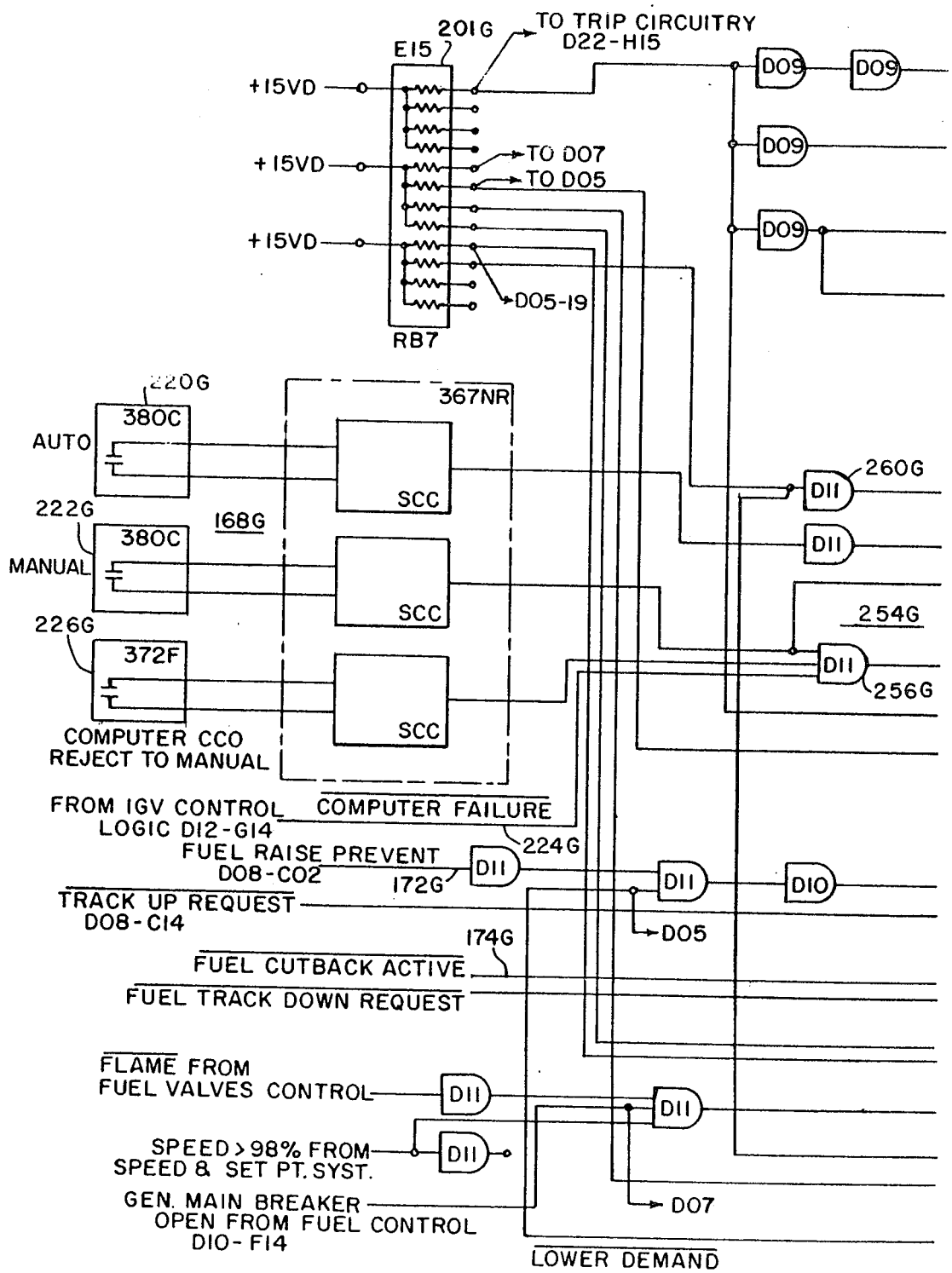
FIGS. 7A through 7H show circuitry which can be employed to embody various functional blocks in FIGS. 6A-6I and FIG. 7I shows how these figures are tied together.
Figure 7B:
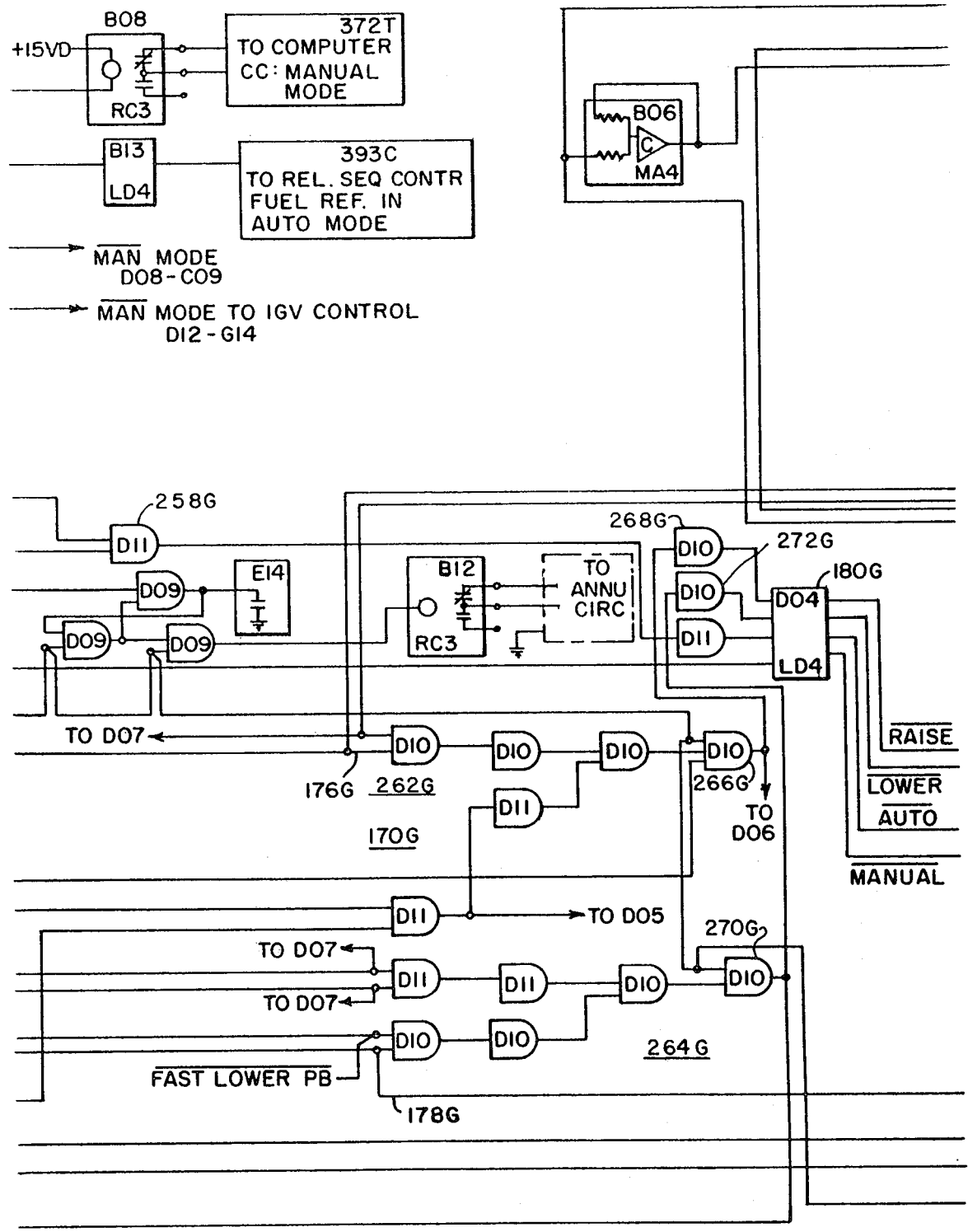
Figure 7C:
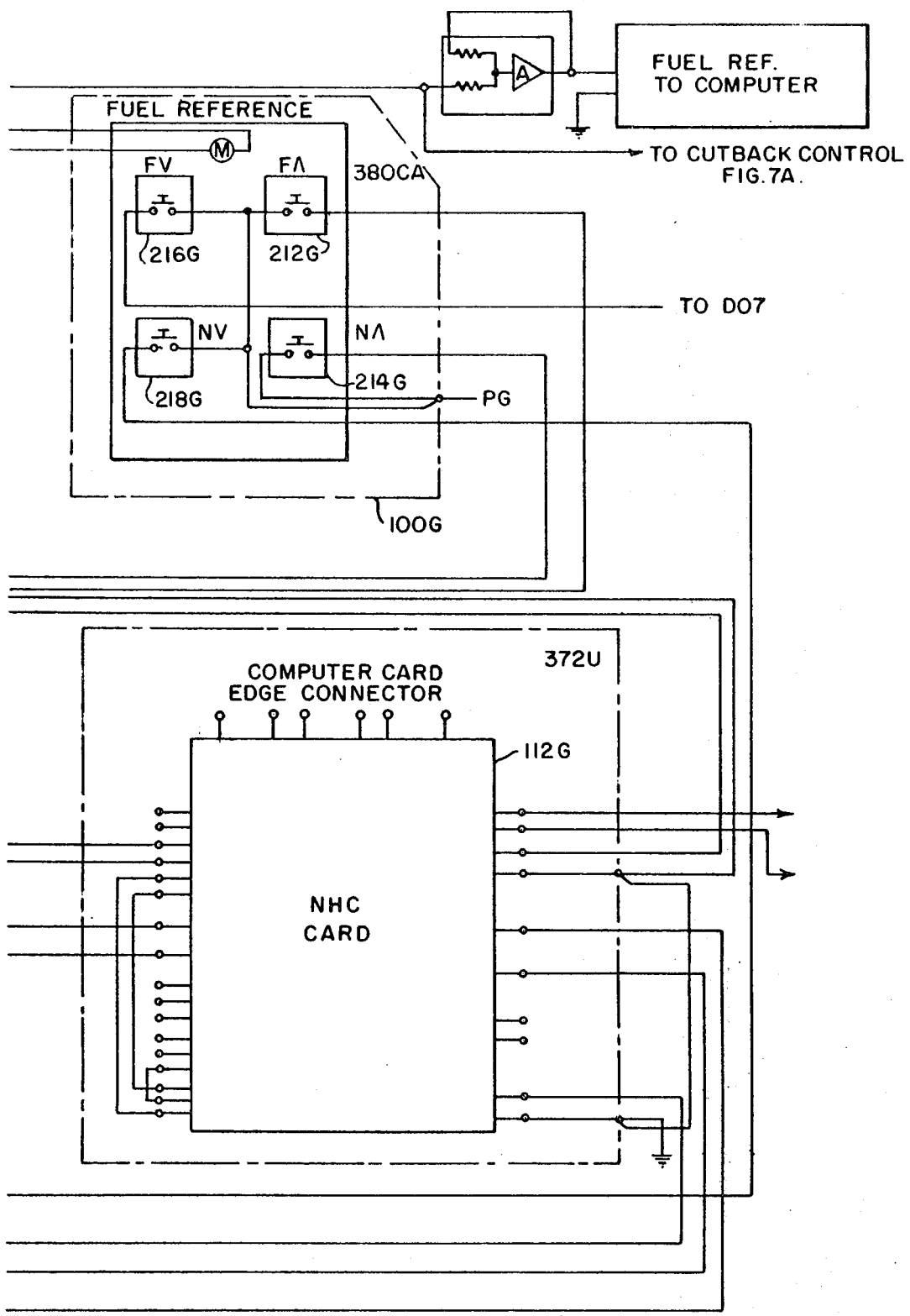
Figure 7D:
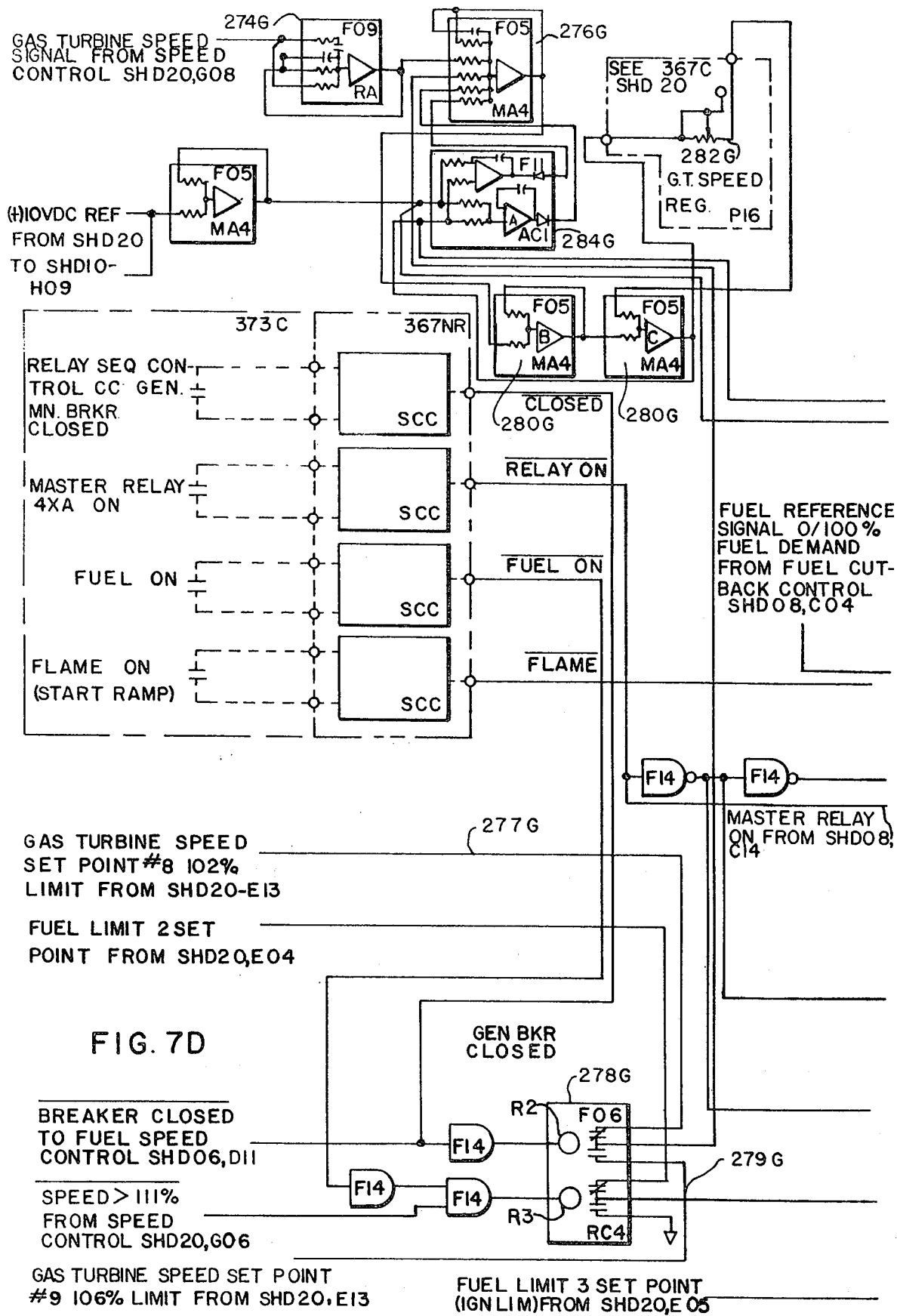

In FIGS. 7A–7I, there is shown circuitry preferably employed to implement functions described in connection with FIGS. 6A–6I. In FIG. 7A, resistors 201G function as pickup resistors to assure proper binary operation of logic circuit elements. To determine the operating mode, the pushbutton and computer reject to manual outputs are applied to mode detection circuitry 254G (FIG. 7A). Thus, AND block 256G generates a manual signal if the manual pushbutton 222G has been operated and the computer has not rejected to manual and the computer has not failed. An AND block 258G generates an automatic mode signal if block 260G indicates the computer is ready for the automatic mode and the automatic pushbutton 220G has been operated. The auto and manual signals are applied to the NHC card 112G, and the manual signal is used for logic and display purposes in various circuits.

The raise and lower pushbuttons 212G, 214G, 216G and 218G generate outputs which are applied to AND logic circuits 262G and 264G respectively. A raise AND block 266G applies a raise signal through AND block 268G to the NHC card 112G if a panel raise request exists or a startup ramp is operative on manual control with a raise permissive (i.e., no fuel hold or fuel cutback in effect). A lower AND block 270G applies a lower signal through an AND block 272G to the NHC card 112G if the fuel cutback channel or the track down channel is active or a panel lower request has been made on manual control.

A low selector circuit 286g transmits the lowest of the speed limit signal and a surge limit signal from a surge limit control 288G. In a low selector circuit 290G, the lowest of the fuel reference signals from the NHC card 112G and the low limit signal from the low selector circuit 286G is selected and transmitted to a high selector circuit 292G where it is compared with a low fuel reference limit signal; the high selector output is applied to a low selector circuit 294G where it is compared to a high fuel reference limit signal. The low limit signal applied to the circuit 292G is controlled by an ignition limit relay 296G, an acceleration limit relay 298G and a minimum fuel limit relay 300G. Logic circuitry 302G controls the operation of the limit relays.

The output from the low selection circuit 294G is the fuel reference signal which is applied to the fuel transfer and throttle valve position control circuitry. If the gas turbine speed exceeds the applicable speed reference, the speed control 276G generates an output which functions as a limit on the output fuel reference signal through operation of the low selector circuit 290G.

Figure 7E:
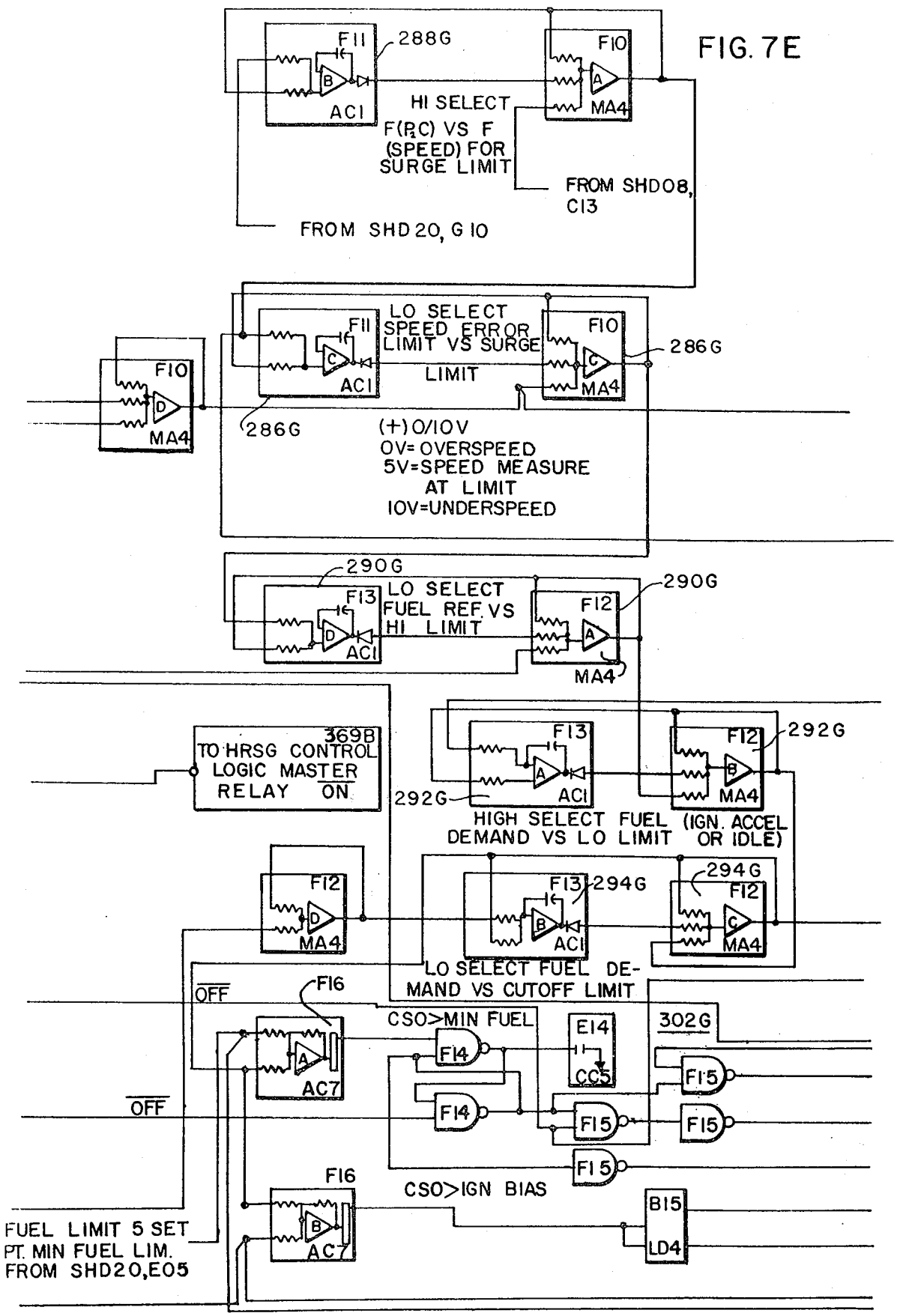
Figure 7G:
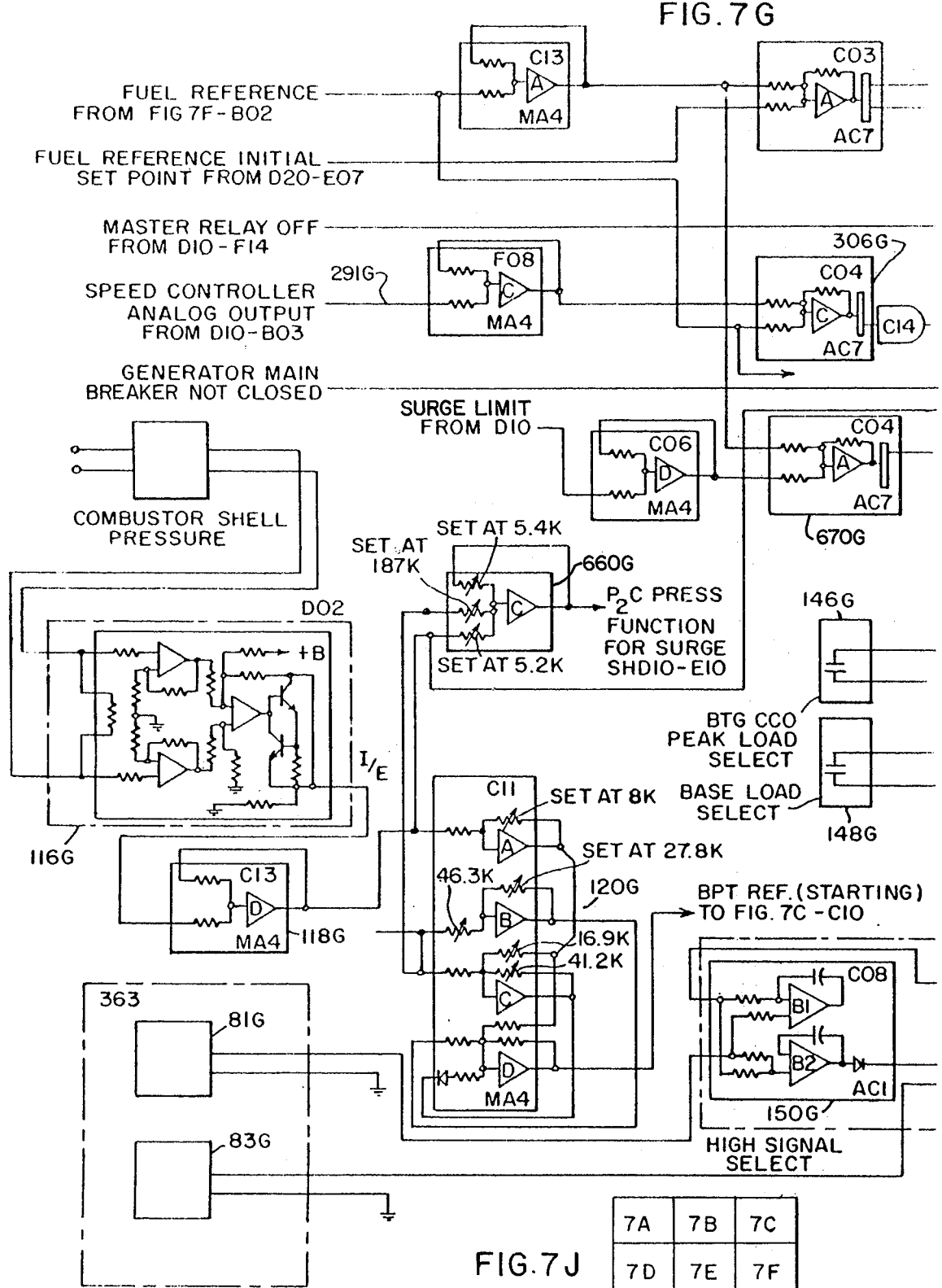
Figure 7H:
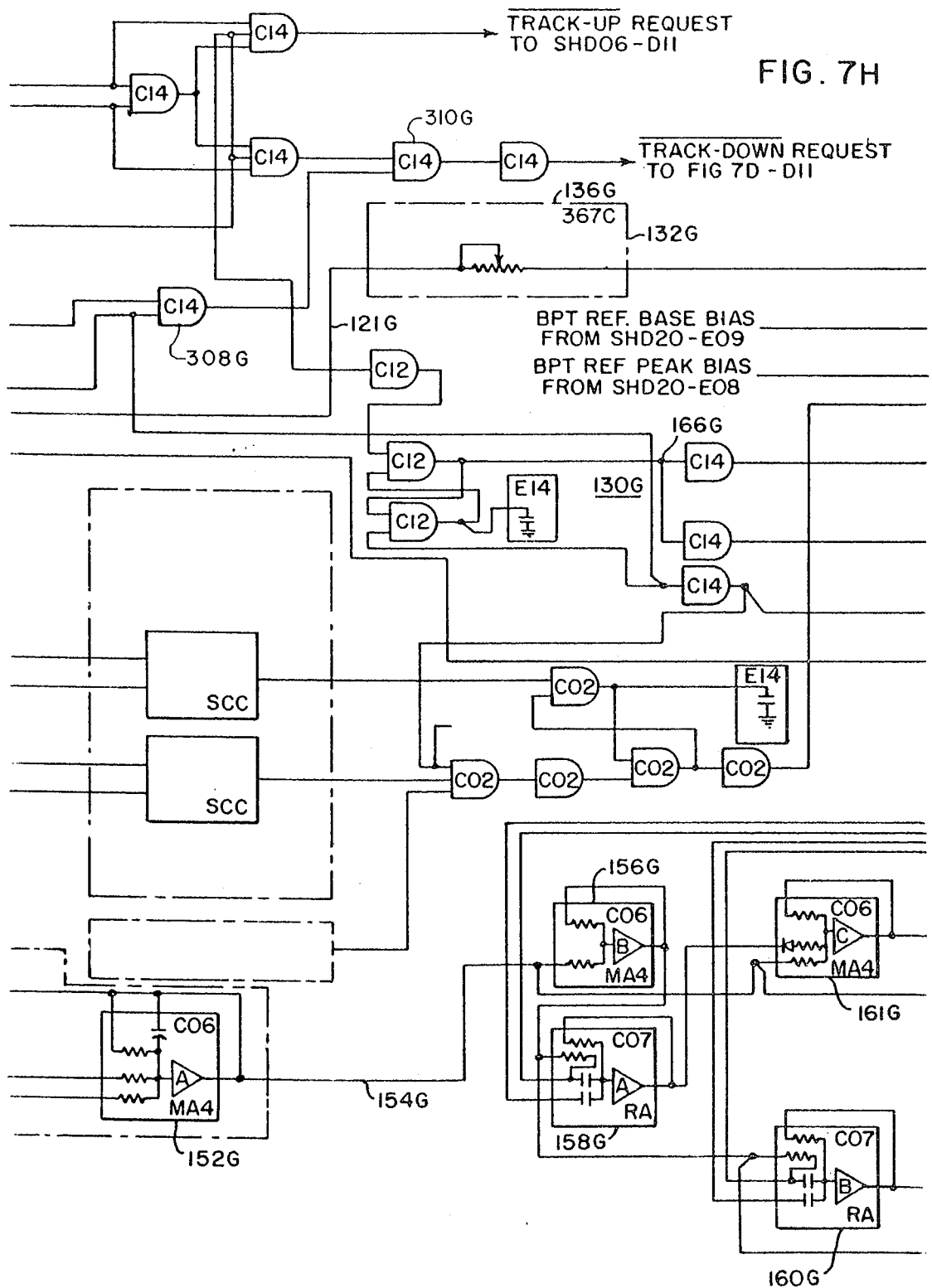
Figure 7I:
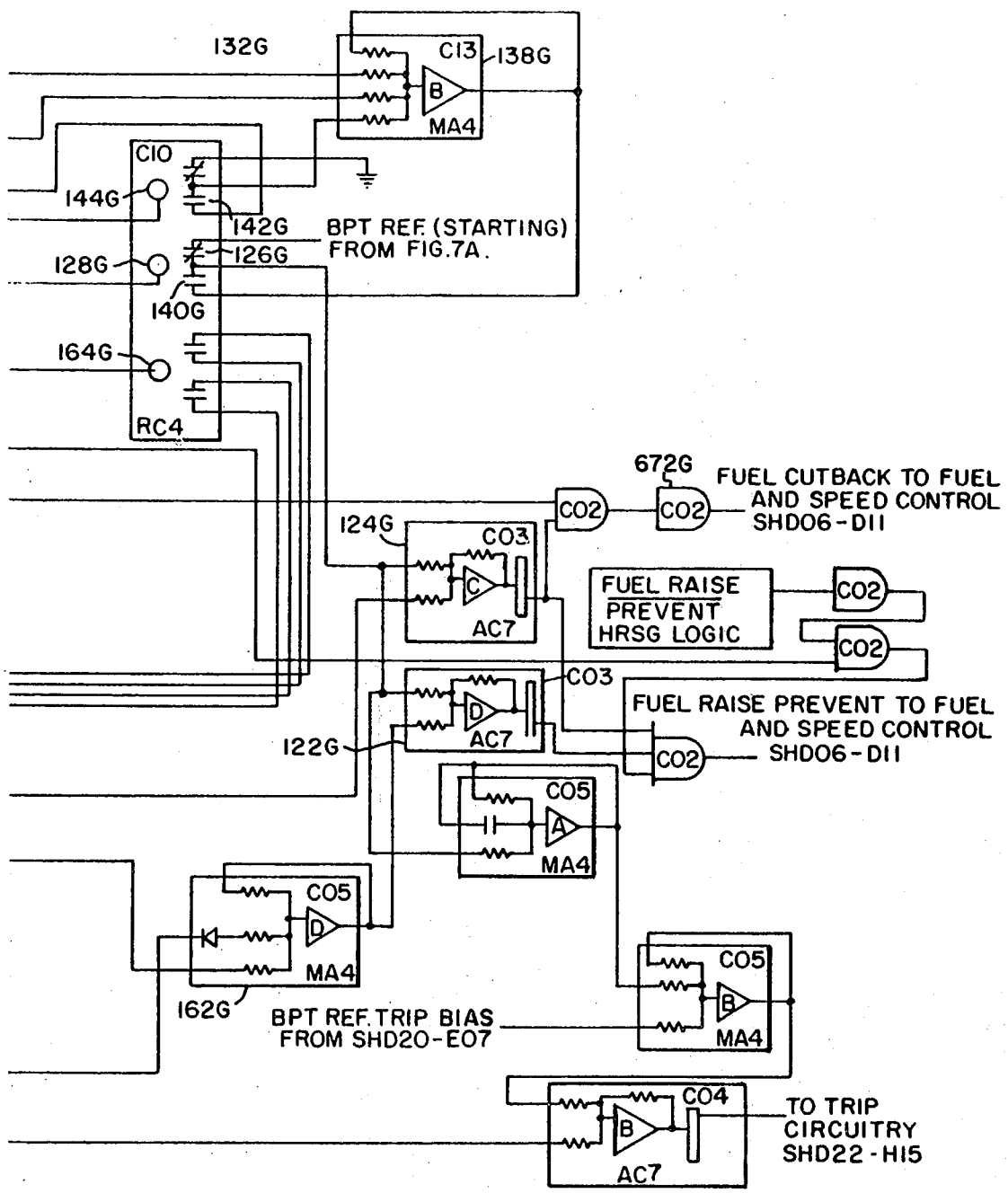
Figure 7J:
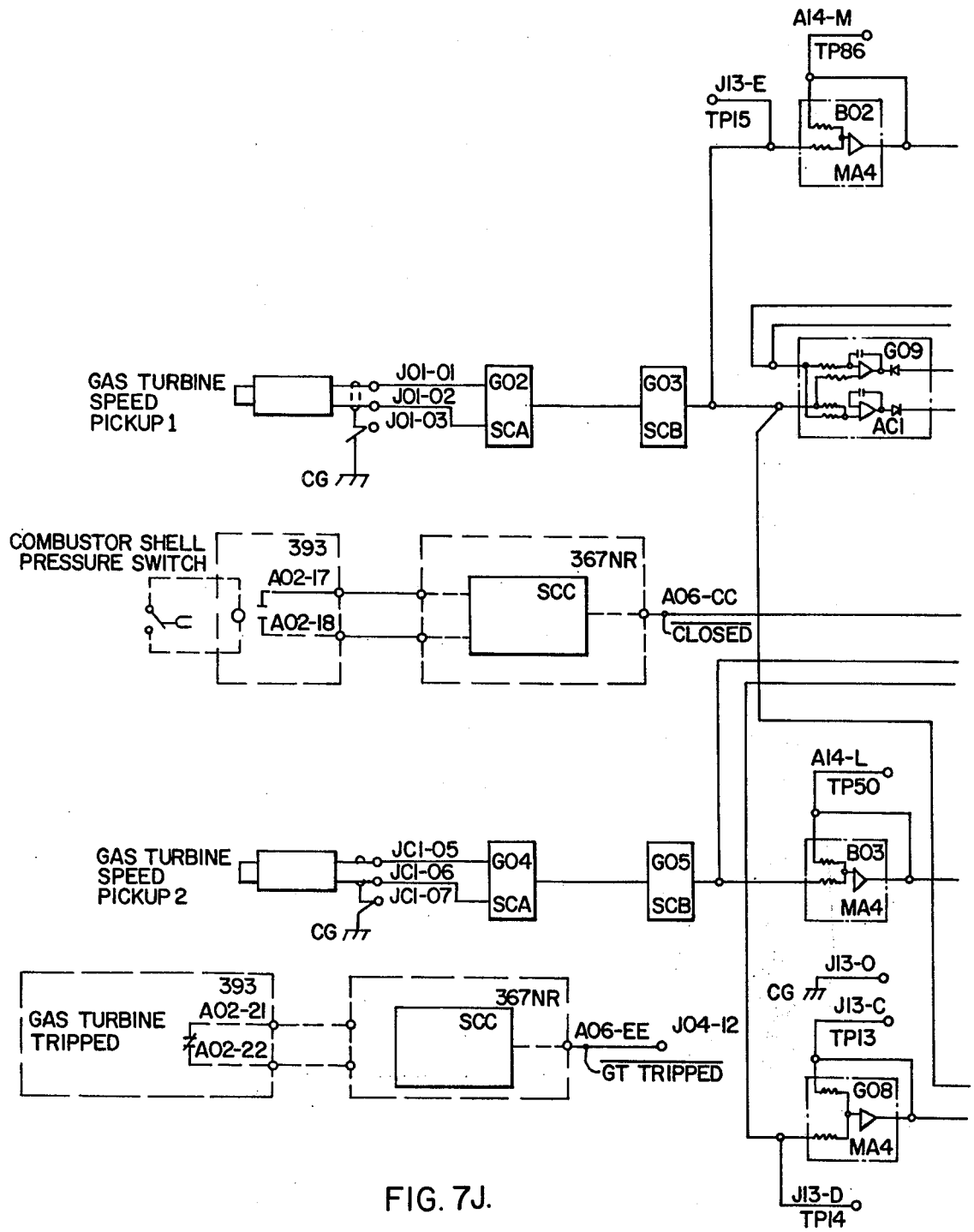
Figure 7K:
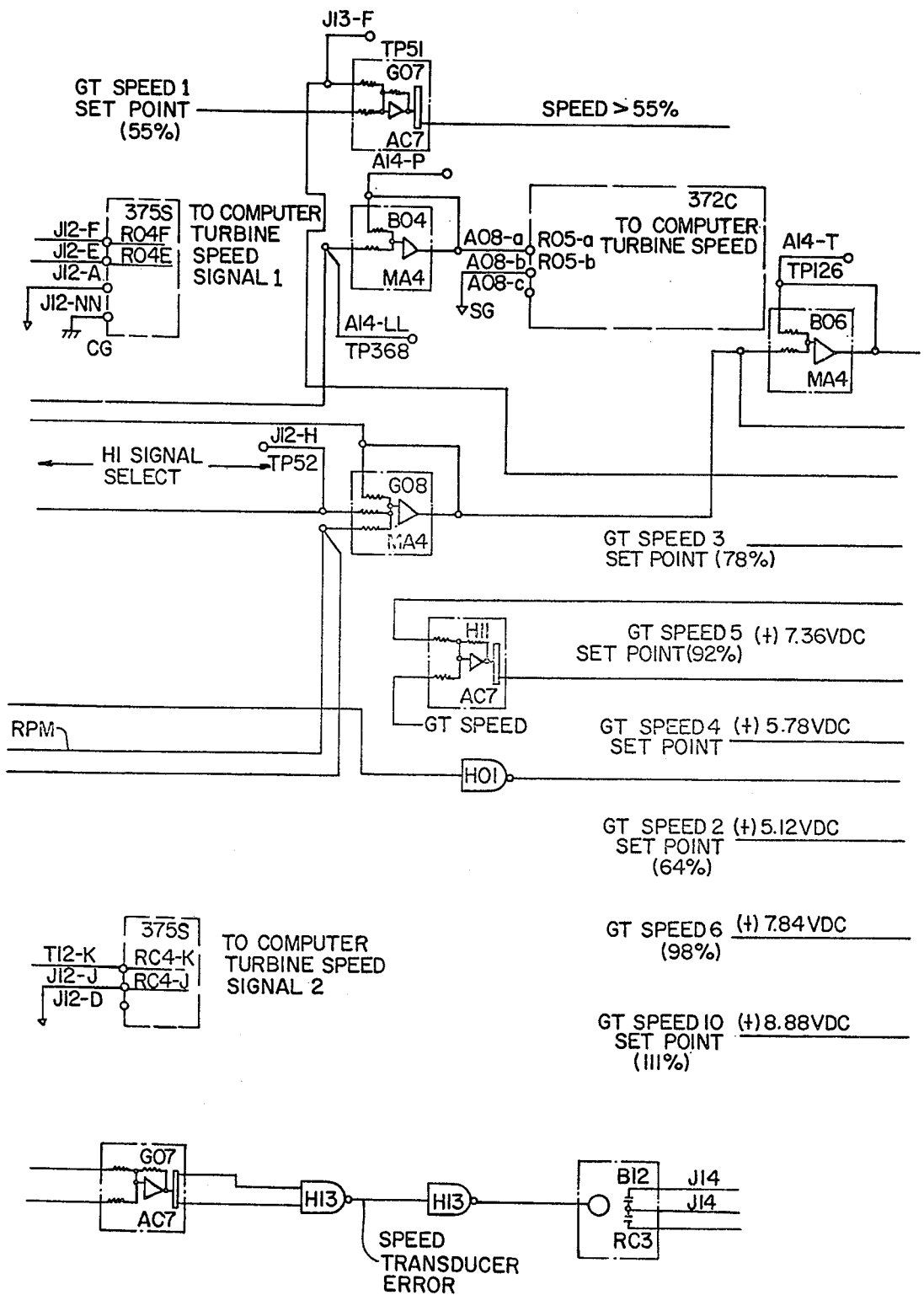
Figure 7L:
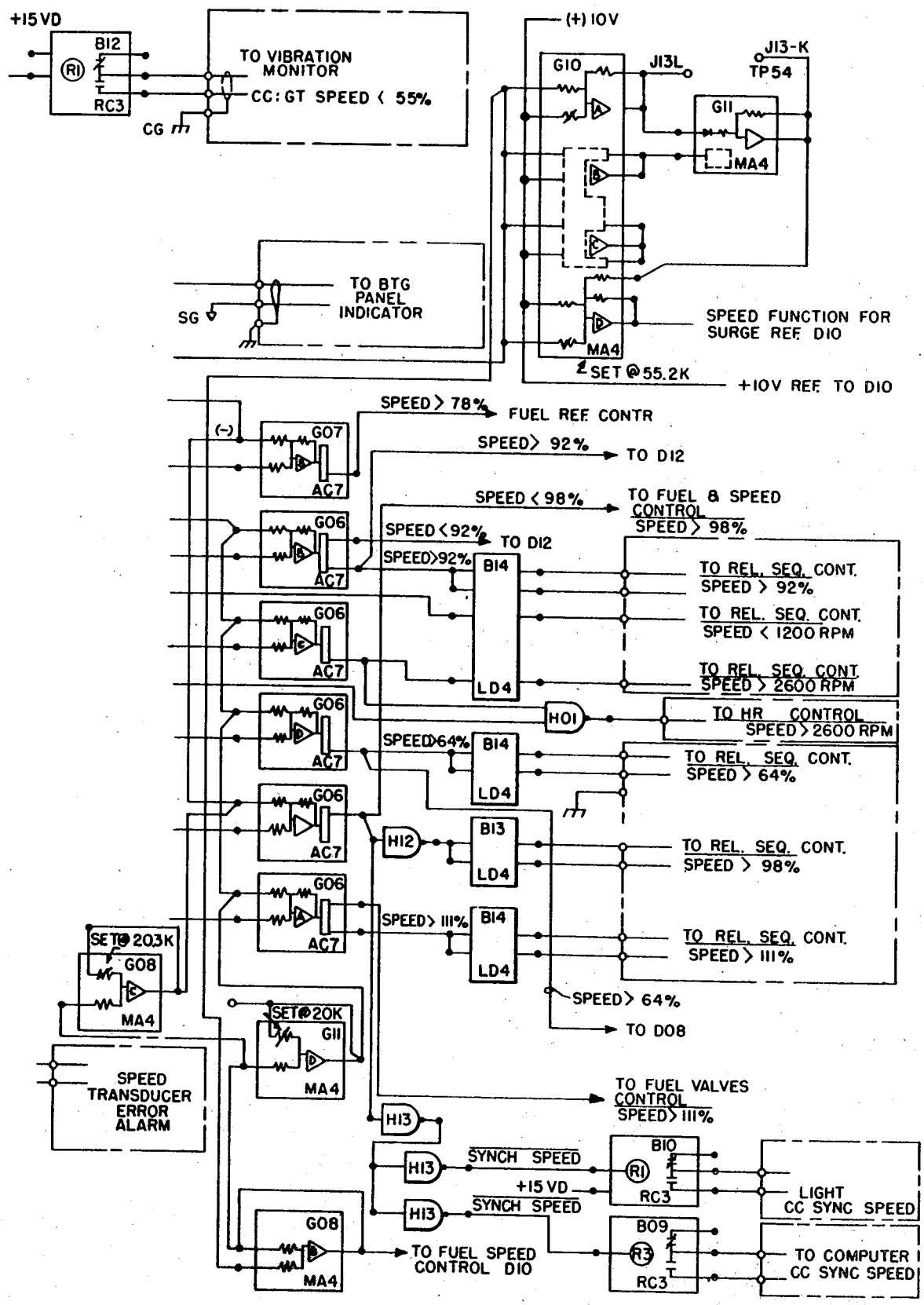

As shown in FIG. 7G, the feedback pressure signal is coupled through a signal conditioner card 116G to a function generator 660G. In FIG. 7E, there is shown a signal indicated by the reference characters 662G which is generated by a surge speed function generator 664G (FIG. 7L) to which a speed signal is applied from the high selector card 666G (FIG. 7J). A high selector circuit 668G functions as part of the surge limit control 288G to generate the high selected surge limit signal for application to the low selector circuit 286G.

To provide for NHC tracking of the fuel reference signal if it is subjected to downstream limit action by the overspeed protection system, the output from the speed controller 276G is applied, as indicated by the reference character 277G, to the input of a high signal monitor 306G (FIG. 7G) where it is compared to the fuel reference output from the NHC card 112G. In the surge protection system, the output from the high surge selector 663G (FIG. 7E) is applied, as indicated by the reference character 668G (FIG. 7F) to a high signal monitor 670G for comparison to the fuel reference signal. If the speed limit signal is lower than the NHC reference output, and if the breaker is open as detected by an AND circuit 308G, a fuel track down request is generated by an OR circuit 310G.

What is claimed is:
1. A gas turbine electric power plant comprising compressor section and a turbine section, a plurality of combustors for energizing the driving gas flow for the turbine section, means for generating electric power under the driving power of the turbine, a gas turbine control system having means for generating an electric fuel reference signal to control the turbine speed and load, at least one throttle valve for said gas turbine, means for controlling the position of said throttle valve to control the flow of fuel to the gas turbine in response to the fuel reference signal from said speed and load controlling means, means for generating an electric signal representative of the turbine speed, means for generating an electric signal representative of combustor shell pressure, and means for generating a surge limit signal in response to said speed and pressure signal generating means to limit the fuel flow and avoid compressor surge in accordance with a predetermined characterization.

2. A gas turbine electric power plant as set forth in claim 1 wherein the predetermined characterization is provided by means for generating a surge speed function which is operative from ignition speed to a higher turbine speed value and a pressure surge function which is operative from the higher turbine speed value to the maximum load operating level.

3. A gas turbine electric power plant as set forth in claim 2 wherein the crossover point of the two functions is at a speed less than synchronous speed.

4. A gas turbine electric power plant as set forth in claim 2 wherein said function generating means includes a proportional function generator for generating a straight line pressure surge function and a proportional controller for generating a speed surge function having at least two straight line parts with different slopes.

5. A gas turbine electric power plant as set forth in claim 1 wherein said speed signal generating means includes at least two speed transducers and means are provided for detecting the highest of the two signals generated by said speed transducers for application to said surge limit signal generating means.

6. A gas turbine electric power plant as set forth in claim 2 wherein means are provided for selecting the highest of the two outputs generated by the pressure surge and speed surge function generators for limiting the fuel flow.

7. A gas turbine electric power plant as set forth in claim 4 wherein said speed signal generating means includes at least two speed transducers, means are provided for detecting the highest of the two signals generated by said speed transducers for application to said surge limit signal generating means, and means are provided for selecting the highest of the two outputs generated by the pressure surge and speed surge function generators for limiting the fuel flow.

8. A combined cycle electric power plant comprising at least one gas turbine, means for generating steam in response to heat energy from said gas turbine, a steam turbine driven by steam supply to it from said steam generating means, means for generating electric power under the driving power of said turbines, means for controlling the operation of said turbines and said steam generating means, said controlling means including a gas turbine control system having means for generating an electric fuel reference signal to control the turbine speed and load, at least one throttle valve for said gas turbine, means for controlling the position of said throttle valve to control the flow of fuel to the gas turbine in response to the fuel reference signal from said speed and load controlling means, means for generating an electric signal representative of the turbine speed, means for generating an electric signal representative of combustor shell pressure, and means for generating a surge limit signal in response to said speed and pressure signal generating means to limit the fuel flow and avoid compressor surge in accordance with a predetermined characterization.

9. A combined cycle electric power plant as set forth in claim 8 wherein the predetermined characterization is provided by means for generating a surge speed function which is operative from ignition speed to a higher turbine speed value and a pressure surge function which is operative from the higher turbine speed value to the maximum load operating level.

10. A combined cycle electric power plant as set forth in claim 9 wherein the crossover point of the two functions is at a speed less than synchronous speed.

11. A combined cycle electric power plant as set forth in claim 9 wherein said function generating means includes a proportional function generator for generating a straight line pressure surge function and a proportional controller for generating a speed surge function having at least two straight line parts with different slopes.

12. A combined cycle electric power plant as set forth in claim 8 wherein said speed signal generating means includes at least two speed transducers and means are provided for detecting the highest of the two signals generated by said speed transducers for application to said surge limit signal generating means.

13. A combined cycle electric power plant as set forth in claim 9 wherein means are provided for selecting the highest of the two outputs generated by the pressure surge and speed surge function generators for limiting the fuel flow.

14. A combined cycle electric power plant as set forth in claim 11 wherein said speed signal generating means includes at least two speed transducers, means are provided for detecting the highest of the two signals generated by said speed transducers for application to said surge limit signal generating means, and means are provided for selecting the highest of the two outputs generated by the pressure surge and speed surge function generators for limiting the fuel flow.

15. A control system for an electric power plant gas turbine having a throttle valve comprising means for generating an electric fuel reference signal to control the turbine speed and load, means for controlling the position of the turbine throttle valve to control the flow of fuel to said gas turbine in response to the fuel reference signal from said speed and load controlling means, means for generating an electric signal representative of combustor shell pressure, and means for generating a surge limit signal in response to said speed and pressure signal generating means to limit the fuel flow and avoid compressor surge in accordance with a predetermined characterization.

16. A control system as set forth in claim 15 wherein the predetermined characterization is provided by means for generating a surge speed function which is operative from ignition speed to a higher turbine speed value and a pressure surge function which is operative from the higher turbine speed value to the maximum load operating level.

17. A control system as set forth in claim 16 wherein the crossover point of the two functions is at a speed less than synchronous speed.

18. A control system as set forth in claim 16 wherein said function generating means includes a proportional function generator for generating a straight line pressure surge function and a proportional controller for generating a speed surge function having at least two straight line parts with different slopes.

19. A control system as set forth in claim 15 wherein said speed signal generating means includes at least two speed transducers and a means are provided for detecting the highest of the two signals generated by said speed transducers for application to said surge limit signal generating means.

20. A control system as set forth in claim 15 wherein means are provided for selecting the highest of the two outputs generated by the pressure surge and speed surge function generators for limiting the fuel flow.

21. A control system as set forth in claim 18 wherein said speed signal generating means includes at least two speed transducers, means are provided for detecting the highest of the two signals generated by said speed transducers for application to said surge limit signal generating means, and means are provided for selecting the highest of the two outputs generated by the pressure surge and speed surge function generators for limiting the fuel flow.

* * * * *